US009726498B2

(12) United States Patent
Meduna et al.

(10) Patent No.: US 9,726,498 B2
(45) Date of Patent: Aug. 8, 2017

(54) COMBINING MONITORING SENSOR MEASUREMENTS AND SYSTEM SIGNALS TO DETERMINE DEVICE CONTEXT

(71) Applicant: Sensor Platforms, Inc., San Jose, CA (US)

(72) Inventors: Deborah Meduna, San Francisco, CA (US); Dev Rajnarayan, Mountain View, CA (US); James V. Steele, Los Gatos, CA (US); Ian Chen, Campbell, CA (US)

(73) Assignee: Sensor Platforms, Inc., San Jose, CA (US)

(*) Notice: Subject to any disclaimer, the term of this patent is extended or adjusted under 35 U.S.C. 154(b) by 647 days.

(21) Appl. No.: 14/090,966

(22) Filed: Nov. 26, 2013

(65) Prior Publication Data

US 2014/0149060 A1 May 29, 2014

Related U.S. Application Data

(60) Provisional application No. 61/731,460, filed on Nov. 29, 2012.

(51) Int. Cl.
*G01C 21/16* (2006.01)
*G06F 1/32* (2006.01)
*G01C 21/34* (2006.01)

(52) U.S. Cl.
CPC ....... *G01C 21/165* (2013.01); *G01C 21/3423* (2013.01); *G06F 1/324* (2013.01); *G06F 1/3206* (2013.01); *Y02B 60/1217* (2013.01)

(58) Field of Classification Search
CPC .................................................. G01C 21/165
(Continued)

(56) References Cited

U.S. PATENT DOCUMENTS 4,964,727 A 10/1990 Huggins
5,128,671 A 7/1992 Thomas, Jr.
(Continued)

FOREIGN PATENT DOCUMENTS

EP 2120134 A1 11/2009
EP 2485119 A2 8/2012
(Continued)

OTHER PUBLICATIONS

International Search Report and Written Opinion for International Application No. PCT/US2013/058055 mailed Dec. 2, 2013.
(Continued)

*Primary Examiner* — Manuel L Barbee
*Assistant Examiner* — Raymond Nimox
(74) *Attorney, Agent, or Firm* — Foley & Lardner LLP

(57) ABSTRACT

A processing apparatus including one or more processors and memory obtains one or more sensor measurements generated by one or more monitoring sensors of one or more devices, including one or more monitoring sensor measurements from a respective monitoring sensor of a respective device and obtains one or more system signals including a respective system signal corresponding to current operation of the respective device. The processing apparatus determines device context information for the respective device based on the one or more sensor measurements and the one or more system signals and adjusts operation of the device in accordance with the device context information.

18 Claims, 14 Drawing Sheets

(58) Field of Classification Search
USPC .......................................................... 702/94
See application file for complete search history.

(56) References Cited

U.S. PATENT DOCUMENTS

| | | | |
|---|---|---|---|
| 5,161,311 | A | 11/1992 | Esmer et al. |
| 5,645,077 | A | 7/1997 | Foxlin |
| 5,819,206 | A | 10/1998 | Horton et al. |
| 5,874,941 | A | 2/1999 | Yamada |
| 6,157,894 | A | 12/2000 | Hess et al. |
| 6,176,837 | B1 | 1/2001 | Foxlin |
| 6,243,476 | B1 | 6/2001 | Gardner |
| 6,593,956 | B1 | 7/2003 | Potts et al. |
| 7,139,983 | B2 | 11/2006 | Kelts |
| 7,158,118 | B2 | 1/2007 | Liberty |
| 7,216,055 | B1 | 5/2007 | Horton et al. |
| 7,246,058 | B2 | 7/2007 | Burnett |
| 7,262,760 | B2 | 8/2007 | Liberty |
| 7,296,363 | B2 | 11/2007 | Danisch et al. |
| 7,350,303 | B2 | 4/2008 | Rock et al. |
| 7,414,611 | B2 | 8/2008 | Liberty |
| 7,451,549 | B1 | 11/2008 | Sodhi et al. |
| 7,647,185 | B2 | 1/2010 | Tarassenko et al. |
| 7,844,415 | B1 | 11/2010 | Bryant et al. |
| 8,223,121 | B2 | 7/2012 | Shaw et al. |
| 8,515,707 | B2 | 8/2013 | Joseph et al. |
| 8,576,169 | B2 | 11/2013 | Shaw et al. |
| 8,577,677 | B2 | 11/2013 | Kim et al. |
| 8,635,172 | B1* | 1/2014 | Buryak ............... G06K 9/6262 706/12 |
| 8,712,069 | B1 | 4/2014 | Murgia et al. |
| 8,787,587 | B1 | 7/2014 | Murgia et al. |
| 9,152,249 | B2 | 10/2015 | Shaw et al. |
| 9,228,842 | B2 | 1/2016 | Joseph et al. |
| 9,316,513 | B2 | 4/2016 | Joseph et al. |
| 2002/0065711 | A1* | 5/2002 | Fujisawa ............ G06Q 30/0601 705/13 |
| 2002/0120217 | A1 | 8/2002 | Adapathya et al. |
| 2002/0169553 | A1 | 11/2002 | Perlmutter et al. |
| 2003/0016835 | A1 | 1/2003 | Elko et al. |
| 2003/0018430 | A1 | 1/2003 | Ladetto et al. |
| 2003/0169891 | A1 | 9/2003 | Ryan et al. |
| 2003/0236604 | A1 | 12/2003 | Lu et al. |
| 2004/0052391 | A1 | 3/2004 | Bren et al. |
| 2005/0008169 | A1 | 1/2005 | Muren et al. |
| 2006/0195254 | A1 | 8/2006 | Ladetto et al. |
| 2006/0217977 | A1 | 9/2006 | Gaeta et al. |
| 2007/0146319 | A1 | 6/2007 | Masselle et al. |
| 2007/0234779 | A1 | 10/2007 | Hsu et al. |
| 2007/0239375 | A1* | 10/2007 | Kaushal ................ C23C 16/52 702/81 |
| 2007/0287911 | A1 | 12/2007 | Haid et al. |
| 2008/0140338 | A1 | 6/2008 | No et al. |
| 2008/0150891 | A1 | 6/2008 | Berkley et al. |
| 2008/0173717 | A1 | 7/2008 | Antebi et al. |
| 2008/0281555 | A1 | 11/2008 | Godin et al. |
| 2009/0055170 | A1 | 2/2009 | Nagahama |
| 2009/0143972 | A1 | 6/2009 | Kitamura et al. |
| 2009/0295722 | A1 | 12/2009 | Yamamoto |
| 2010/0060573 | A1 | 3/2010 | Moussavi |
| 2010/0088061 | A1 | 4/2010 | Horodezky et al. |
| 2010/0095773 | A1 | 4/2010 | Shaw et al. |
| 2010/0097316 | A1 | 4/2010 | Shaw et al. |
| 2010/0128881 | A1 | 5/2010 | Petit et al. |
| 2010/0128894 | A1 | 5/2010 | Petit et al. |
| 2010/0174506 | A1 | 7/2010 | Joseph et al. |
| 2010/0194879 | A1 | 8/2010 | Pasveer et al. |
| 2010/0315905 | A1 | 12/2010 | Lee et al. |
| 2010/0318257 | A1 | 12/2010 | Kalinadhabhotla |
| 2011/0054787 | A1* | 3/2011 | Mayor ................ G01C 21/165 701/469 |
| 2011/0106418 | A1* | 5/2011 | van der Merwe ..... G01C 21/12 701/532 |
| 2011/0172918 | A1* | 7/2011 | Tome ................... G01C 21/165 701/500 |
| 2011/0239026 | A1 | 9/2011 | Kulik |
| 2011/0241656 | A1 | 10/2011 | Piemonte et al. |
| 2012/0007713 | A1 | 1/2012 | Nasiri et al. |
| 2012/0011351 | A1 | 1/2012 | Mundra et al. |
| 2012/0058803 | A1 | 3/2012 | Nicholson |
| 2012/0086725 | A1 | 4/2012 | Joseph et al. |
| 2012/0130667 | A1 | 5/2012 | Fukushima et al. |
| 2012/0252425 | A1* | 10/2012 | Moeglein ............... H04W 84/18 455/418 |
| 2012/0265717 | A1* | 10/2012 | Narayanan ............ G06N 99/005 706/12 |
| 2012/0268249 | A1 | 10/2012 | Kansal et al. |
| 2013/0174636 | A1 | 7/2013 | Joseph |
| 2013/0179108 | A1 | 7/2013 | Joseph et al. |
| 2013/0192333 | A1 | 8/2013 | Tohta |
| 2013/0253821 | A1 | 9/2013 | Joseph et al. |
| 2013/0253880 | A1 | 9/2013 | Joseph et al. |
| 2013/0332113 | A1* | 12/2013 | Piemonte .......... H04M 1/72569 702/189 |
| 2014/0139432 | A1 | 5/2014 | Shaw et al. |
| 2015/0247729 | A1 | 9/2015 | Meduna et al. |
| 2016/0026265 | A1 | 1/2016 | Shaw et al. |

FOREIGN PATENT DOCUMENTS

| | | |
|---|---|---|
| EP | 2579127 A1 | 4/2013 |
| WO | WO2005040991 A2 | 5/2005 |
| WO | WO2005108119 A2 | 11/2005 |
| WO | WO2006054295 A1 | 5/2006 |
| WO | WO2006090197 A1 | 8/2006 |
| WO | WO2010048000 A2 | 4/2010 |
| WO | WO2010080383 A1 | 7/2010 |
| WO | WO2011109229 A1 | 9/2011 |
| WO | WO2013104006 A2 | 7/2013 |
| WO | WO2013148585 A1 | 10/2013 |
| WO | WO2014039552 A1 | 3/2014 |
| WO | WO2014085615 A2 | 6/2014 |

OTHER PUBLICATIONS

Vinande et al., "Mounting-Angle Estimation for Personal Navigation Devices," IEEE Transactions on Vehicular Technology, vol. 59, No. 3, Mar. 2010, pp. 1129-1138.

Zhao et al. "Towards Arbitrary Placement of Multi-Sensors Assisted Mobile Navigation System," In Proceedings of the 23rd International Technical Meeting of the Satellite Division of The Institute of Navigation, Portland, OR, Sep. 21-24, 2010, pp. 556-564.

Specification, U.S. Appl. No. 61/615,327, filed Mar. 25, 2012.

International Search Report and Written Opinion mailed Dec. 19, 2014 in Patent Cooperation Treaty Application No. PCT/US2013/072278, filed Nov. 27, 2013.

Wang et al., "A Framework of Energy Efficient Mobile Sensing for Automatic User State Recognition", Proceedings of the 7th International Conference on Mobile Systems, Applications, and Services, MOBISYS '09, Jan. 1, 2009, pp. 179-192.

Ang, Wei Tech et al., "Kalman Filtering for Real-Time Orientation Tracking of Handheld Microsurgical Instrument," Proceedings of 2004 IEEE/RSJ International Conference on Intelligent Robots and Systems; Sep. 28-Oct. 2, 2004; Sendai, Japan, pp. 2574-2580.

International Search Report and Written Opinion mailed May 18, 2010 in Patent Cooperation Treaty Application No. PCT/US2009/060475, filed Oct. 13, 2009.

International Search Report and Written Opinion mailed May 3, 2010 in Patent Cooperation Treaty Application No. PCT/US2009/067976, filed Dec. 15, 2009.

Simon, D., "Kalman Filtering," Embedded Systems Programming, vol. 14, No. 6, Jun. 2001, pp. 72-79.

International Search Report and Written Opinion mailed Jan. 31, 2012 in Patent Cooperation Treaty Application No. PCT/US2011/052185.

Foxlin, E., "Inertial Head-Tracker Sensor Fusion by a Complementary Separate-Bias Filter," In Proceedings of the IEEE Virtual Reality Annual International Symposium, 1996, pp. 185-195.

(56) References Cited

OTHER PUBLICATIONS

Foxlin et al., "Miniature 6-DOF Inertial System for Tracking HMDs," in SPIE, vol. 3362, Helmet and Head-Mounted Displays, III, AeroSense 98, Orlando, FL, Apr. 13-14, 1998, pp. 1-15.

International Search Report and Written Opinion mailed Jul. 29, 2013 in Patent Cooperation Treaty Application No. PCT/US2013/033723, filed Mar. 25, 2013.

Sedlak, J. "Spinning Spacecraft Attitude Estimation Using Markley Variables: Filter Implementation and Results," NASA Goddard Space Flight Center CP-2005-212789, Greenbelt, MD (2005), 15 pages.

Luong-Van et al. "Covariance Profiling for an Adaptive Kalman Filter to Suppress Sensor Quantization Effects," 43rd IEEE Conference on Decision and Control, vol. 3, Dec. 14-17, 2004, pp. 2680-2685.

Girod et al., "The Design and Implementation of a Self-Calibrating Distributed Acoustic Sensing Platform," SenSys 06, Nov. 1-3, 2006, 14 pages.

Kim et al., "Modeling and Calibration of a Multi-Spectral Imaging Sensor for In-Field Crop Nitrogen Assessment," Applied Engineering in Agriculture, vol. 22, No. 6, Sep. 2006, pp. 935-941.

Ramanathan et al., "Rapid Deployment with Confidence: Calibration and Fault Detection in Environmental Sensor Networks," Center for Embedded Networked Sensing, UCLA, Department of Civil and Environmental Engineering, MIT, Jul. 4, 2006, pp. 1-14.

Bychkovskiy, Vladimir Leonidovich, "Distributed In-Place Calibration in Sensor Networks," University of California Master of Science in Computer Science Thesis, 2003. 42 pages.

Sedlak et al., "Automated Attitude Sensor Calibration: Progress and Plans," In Paper No. AIAA-2004-4854, AIAA/AAS Astrodynamics Specialist Conference, Aug. 2004, Providence, RI, vol. 2, No. 4, 14 pages.

International Search Report and Written Opinion mailed Sep. 13, 2013 in Patent Cooperation Treaty Application No. PCT/US2013/020687, filed Jan. 8, 2013.

International Search Report and Written Opinion mailed Nov. 30, 2011 in Patent Cooperation Treaty Application No. PCT/US2009/060475, filed Oct. 13, 2009.

Jimenez et al., "A Comparison of Pedestrian Dead-Reckoning Algorithms Using a Low-Cost MEMS IMU," WISP 2009. 6th IEEE International Symposium on Intelligent Signal Processing, Aug. 26-28, 2009. pp. 37-42.

\* cited by examiner

COMBINING MONITORING SENSOR MEASUREMENTS AND SYSTEM SIGNALS TO DETERMINE DEVICE CONTEXT

RELATED APPLICATIONS

This application claims priority to U.S. Provisional Patent Application Ser. No. 61/731,460, filed Nov. 29, 2012, entitled "Combining Monitoring Sensor Measurements and System Signals to Determine Device Context," which application is incorporated by reference in its entirety.

TECHNICAL FIELD

The disclosed embodiments relate generally to determining device context in accordance with sensor measurements and system signals.

BACKGROUND

Devices have access to sensor measurements from one or more sensors. These sensor measurements can be used to determine information about states associated with the device such as a coupling state of the device to one or more entities, a state of one or more entities physically associated with the device and/or a state of an environment in which the device is located.

SUMMARY

While sensor measurements can provide useful information regarding current usage patterns of a device and other device context information, they are not the only information available to a device. Additional system signals, such as inputs from applications and system events also provide useful information regarding current usage patterns of the device. However combining sensor measurements and other system signals can be complex and inefficient. Moreover, the same set of system signals and sensor measurements are not always available on all devices, thus there is a need for an efficient and effective way to acquire relevant information and use this information to determine device context information indicative of current usage patterns and device context. One approach to determining device context information that enables the device to respond to changes in usage patterns includes combining sensor measurements and other system signals in a probabilistic model that generates outputs that indicate changes in usage patterns of the device. These outputs enable the device to record additional data or cease to record unnecessary data when a particular usage pattern is detected, thereby improving the accuracy and/or efficiency of the device.

Some embodiments provide a method for determining device context at a processing apparatus having one or more processors and memory storing one or more programs that, when executed by the one or more processors, cause the respective processing apparatus to perform the method. The method includes obtaining one or more sensor measurements generated by one or more monitoring sensors of one or more devices, including one or more monitoring sensor measurements from a respective monitoring sensor of a respective device; and obtaining one or more system signals including a respective system signal corresponding to current operation of the respective device. The method further includes determining device context information for the respective device based on the one or more sensor measurements and the one or more system signals; and adjusting operation of the device in accordance with the device context information.

In accordance with some embodiments, a computer system (e.g., a navigation sensing device or a host computer system) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium (e.g., for use by a navigation sensing device or a host computer system) has stored therein instructions which when executed by one or more processors, cause a computer system (e.g., a navigation sensing device or a host computer system) to perform the operations of any of the methods described above.

BRIEF DESCRIPTION OF THE DRAWINGS

Like reference numerals refer to corresponding parts throughout the drawings.

DESCRIPTION OF EMBODIMENTS

Context Awareness

Figure 1:
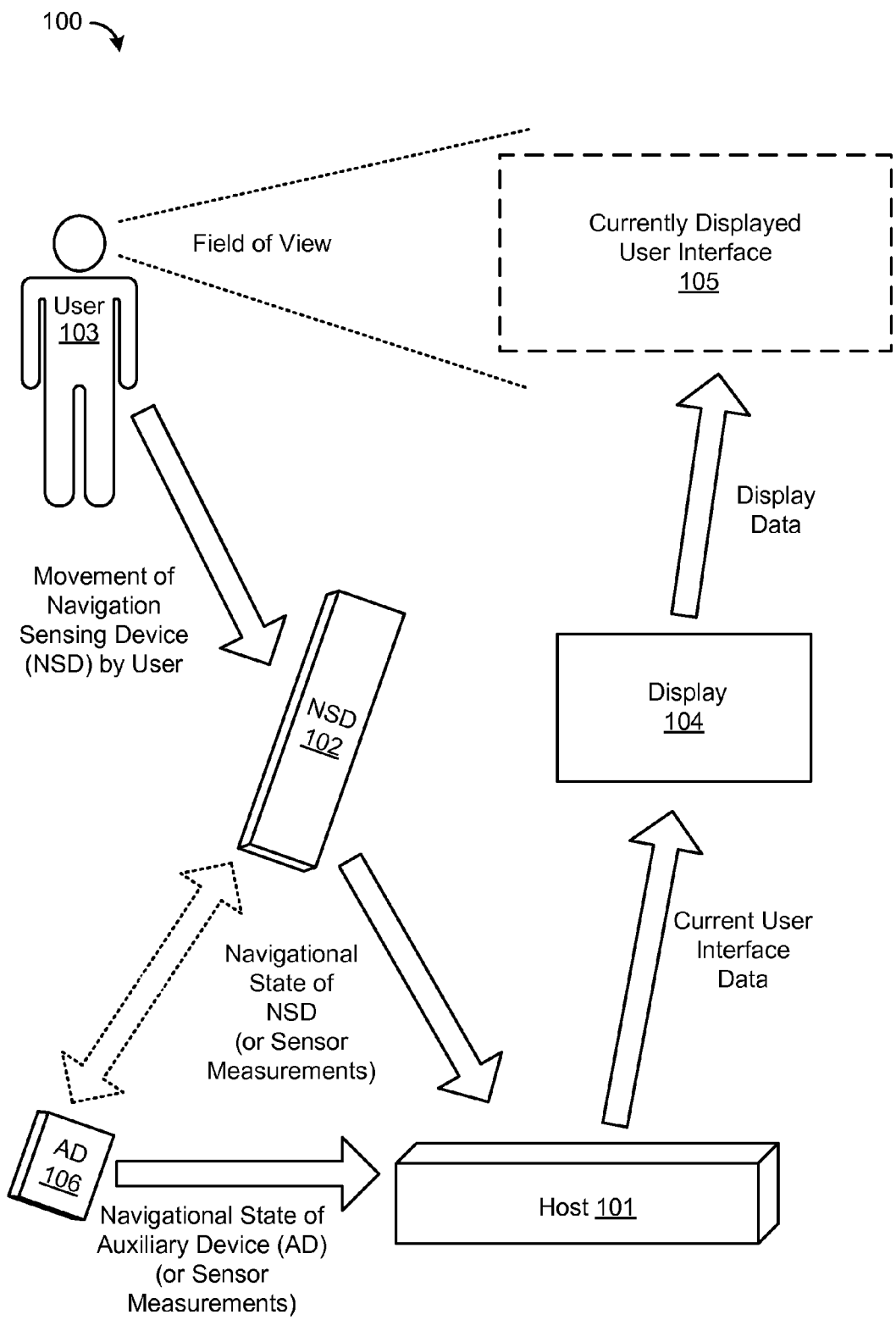
FIG. 1 illustrates a system for using a navigation sensing device, according to some embodiments.

Different navigation sensing devices use different sensors to detect different system statuses: inertial sensors for device motion, proximity sensor for user position relative to the device, global positioning system (GPS) sensors for position relative to a predefined navigational coordinate system. However, some applications that use more than one set of sensor results do not combine inputs from multiple sensor subsystems to implement new functions. For example, navigation sensing devices use application data, usage history, GPS or other beacons, and some even use system-level information such as Bluetooth connections and wireless networking (Wi-Fi) networks separately. However, substantial advantages can be realized by combining sensor measurements from monitoring sensors (e.g., inertial sensors and other low power "always on" sensors) can be combined with other sensors in a mobile device, along with other operating system services and functions to improve the context detection performance, reduce power consumption, or expand utility of the navigation sensing device.

For example, a device (e.g., a navigation sensing device) can use sensors to evaluate the natural motions of a user and analyze the data pattern intelligently to deduce what the user is doing. Similarly, sensors can also record changes in their users' environments, such as magnetic field characteristics and ambient pressure to help applications infer their surroundings. What the user is doing (e.g., a current usage pattern of the device) and an environment surrounding a device are sometimes referred to as a device context or device context information. Context aware applications can modify their interaction with their users depending on contexts. Device context of a respective device, as used herein, refers to one or more contexts associated with the respective device. Examples of contexts associated with the respective device (i.e., device context) include, without limitation, a usage pattern of the respective device, a navigational state (e.g., position or orientation) of the respective device, a change in navigational state (e.g., translation or rotation) of the respective device, an environment of the respective device, and activities of a user of the respective device (e.g., a posture of the user, a physical activity of the user, a current task of the user, or other information about what the user is doing or how the user is behaving), where these contexts are determined using information obtained from or by the device.

As one example of a context aware application, a car locater application can annotate the location using location information from GPS or Wi-Fi, allow users to append a photo, video or notes about the surrounding. A context aware car locator application can rely on context interpretation procedures, monitor sensor data and note the moment the user has just left his car. That way, in situations when the user is absent minded or in a hurry, the application acts autonomously and records the parking location. Then hours later when the user realizes he does not remember where he left his car, he can consult the application and get the automatically recorded location.

As another example, a context aware mapping application can, by default, provide a pedestrian with walking directions instead of driving directions when the device detects movements that correspond to the user walking. For the context aware mapping application, a user would not need to actively inform his telephone that he is currently walking but can, instead, rely on a determination made by the device that the device has a "user is walking" context.

Another example is a context aware device finder application that operates by keeping track of a history of contexts of the device. A frequent problem with portable electronic devices is that they can be easily misplaced, and if the device's notification sounds are also muffled or inaudible, finding the device can be difficult or impossible. Using GPS or wireless triangulation location information often does not provide sufficiently precise location information to enable the device to be located. However, with this location information and some information regarding the history of contexts of the device the device can deduce when the user is in possession of his telephone and when the telephone leaves his person. Thus, a context aware device finder application could provide additional information including a prior context of the device and a time of last use. For example, the context aware device finder application can tell the user that he last had possession of his telephone when he was sitting down at three o'clock on that same day and, optionally, remind the user that he was reading his email on the telephone immediately before he set it down. In another scenario, the context aware device finder application can determine that the user was in possession of his telephone in his car, and that the telephone never left the car. Such additional information can help users back track to find their devices.

In addition to providing additional useful information, context awareness can contribute to prolonging battery life by allowing more aggressive system power management. For example, by knowing that the user has not moved from his seat and has stayed close to a fixed location, a device would not need to turn on the GPS at all to maintain location services. In this example, a context aware power manager can turn off the GPS and make the assumption that available Wi-Fi connections have not changed, thereby conserving battery power without unnecessary intrusion into the user experience. As another example, when device context information indicates, with a high degree of confidence, that the user is not looking at the screen, for example the device is in a pocket, the backlight would not be turned on, even in circumstances where the backlight would normally be turned on (e.g., when a user presses a power button). An aggressive power manager can even set a very short time-out period for turning off the backlight normally; but when context suggests the user is reading the screen, the device would automatically relax the limit so as not to interfere with the user's use of the device.

While these advantages of context awareness could be implemented on an application-by-application basis, in many circumstances it will be more efficient and effective to generate context signals on a system-wide basis for a device and provide access to these context signals to multiple applications through an application program interface (API). For example, an application can register with an API library as a context listener so that the application is alerted when the context is detected or when the context changes. Alternatively, the application can query a system-wide context manager for the state of a current context. For example, a power manager application optionally registers with the system wide context manager so that when the telephone goes into a pocket it would disable the backlight when the telephone rings; similarly a ring tone application optionally checks if the telephone is in a pocket and if so the ring tone application increases the ring tone volume, so that the user is more likely to hear the ring tone even if it is muffled by the pocket.

Example Use Cases for Navigation Sensing Devices

Navigation sensing devices (e.g., human interface devices or motion tracking device) that have a determinable multi-dimensional navigational state (e.g., one or more dimensions of displacement and/or one or more dimensions of rotation or attitude) are becoming increasingly common for providing input for many different applications. For example, such a navigation sensing device may be used as a motion tracking device to track changes in position and/or orientation of the device over time. These tracked changes can be used to map movements and/or provide other navigational state dependent services (e.g., location or orientation based alerts, etc.). In some situations, pedestrian dead reckoning (PDR) is used to determine changes in position of an entity that is physically associated with a device (e.g., by combining direction of motion information for the entity with stride count and stride length information). However, in circumstances where the physical coupling between the navigation sensing device and the entity is variable, the navigation sensing device uses sensor measurements to determine both changes in the physical coupling between the navigation sensing device and the entity (e.g., a "device-to-entity orientation") and changes in direction of motion of the entity.

As another example, such a navigation sensing device may be used as a multi-dimensional pointer to control a pointer (e.g., a cursor) on a display of a personal computer, television, gaming system, etc. As yet another example, such a navigation sensing device may be used to provide augmented reality views (e.g., by overlaying computer generated elements over a display of a view of the real world) that change in accordance with the navigational state of the navigation sensing device so as to match up with a view of the real world that is detected on a camera attached to the navigation sensing device. In other situations, such a navigation sensing device may be used to provide views of a virtual world (e.g., views of portions of a video game, computer generated simulation, etc.) that change in accordance with the navigational state of the navigation sensing device so as to match up with a virtual viewpoint of the user based on the orientation of the device. In this document, the terms orientation, attitude and rotation are used interchangeably to refer to the orientation of a device or object with respect to a frame of reference. Additionally, a single navigation sensing device is optionally capable of performing multiple different navigation sensing tasks described above either simultaneously or in sequence (e.g., switching between a multi-dimensional pointer mode and a pedestrian dead reckoning mode based on user input).

In order to function properly (e.g., return results to the user that correspond to movements of the navigation sensing device in predictable ways), these applications rely on sensors that determine accurate estimates of the current state(s) associated with the device (e.g., a navigational state of the device, a user-device coupling state, a state of a user physically associated with the device and/or a state of an environment of the device). While specific use cases are described above and will be used to illustrate the general concepts described herein, it should be understood that these examples are non-limiting examples and that the embodiments described herein would apply in an analogous manner to any device that would benefit from an accurate estimate of the current state(s) associated with the device (e.g., a navigational state of the device, a user-device coupling state, a state of a user who is physically associated with the device and/or a state of an environment of the device).

System Overview

Attention is now directed to FIG. 1, which illustrates an example system 100 for using a navigation sensing device (e.g., a human interface device such as a multi-dimensional pointer) to manipulate a user interface. As shown in FIG. 1, an example Navigation Sensing Device 102 (hereinafter "Device 102") is coupled to a Host Computer System 101 (hereinafter "Host 101") through a wireless interface, according to some embodiments. In these embodiments, a User 103 moves Device 102. These movements are detected by sensors in Device 102, as described in greater detail below with reference to FIG. 2. Device 102, or Host 101, generates a navigational state of Device 102 based on sensor measurements from the sensors and transmits the navigational state to Host 101. Alternatively, Device 102 generates sensor measurements and transmits the sensor measurements to Host 101, for use in estimating a navigational state of Device 102. Host 101 generates current user interface data based on the navigational state of Device 102 and transmits the current user interface data to Display 104 (e.g., a display or a projector), which generates display data that is displayed to the user as the currently displayed User Interface 105. While Device 102, Host 101 and Display 104 are shown in FIG. 1 as being separate, in some embodiments the functions of one or more of these elements are combined or rearranged, as described in greater detail below with reference to FIGS. 3A-3E.

In some embodiments, an Auxiliary Device 106 also generates sensor measurements from one or more sensors and transmits information based on the sensor measurements (e.g., raw sensor measurements, filtered signals generated based on the sensor measurements or other device state information such as a coupling state of Auxiliary Device 106 or a navigational state of Auxiliary Device 106) to Device 102 and/or Host 101 via wired or wireless interface, for use in determining a state of Device 102. It should be understood that Auxiliary Device 106 optionally has one or more of the features, components, or functions of Navigation Sensing Device 102, but those details are not repeated here for brevity.

In some implementations, the user can use Device 102 to issue commands for modifying the user interface, control objects in the user interface, and/or position objects in the user interface by moving Device 102 so as to change its navigational state. In some embodiments, Device 102 is sensitive to six degrees of freedom: displacement along the x-axis, displacement along the y-axis, displacement along the z-axis, yaw, pitch, and roll. In some other situations, Device 102 is a navigational state tracking device (e.g., a motion tracking device) that tracks changes in the navigational state of Device 102 over time but does not use these changes to directly update a user interface that is displayed to the user. For example, the updates in the navigational state can be recorded for later use by the user or transmitted to another user or can be used to track movement of the device and provide feedback to the user concerning their movement (e.g., directions to a particular location near the user based on an estimated location of the user). When used to track movements of a user without relying on external location information (e.g., Global Positioning System signals), such motion tracking devices are also sometimes referred to as pedestrian dead reckoning devices.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces. In some embodiments, the wireless interface is a unidirectional wireless interface from Device 102 to Host 101. In some embodiments, the wireless interface is a bidirectional wireless interface. In some embodiments, bidirectional communication is used to perform handshaking and pairing operations. In some embodiments, a wired interface is used instead of or in addition to a wireless interface. As with the wireless interface, the wired interface is, optionally, a unidirectional or bidirectional wired interface.

In some embodiments, data corresponding to a navigational state of Device 102 (e.g., raw measurements, calculated attitude, correction factors, position information, etc.) is transmitted from Device 102 and received and processed on Host 101 (e.g., by a host side device driver). Host 101 uses this data to generate current user interface data (e.g., specifying a position of a cursor and/or other objects in a user interface) or tracking information.

Figure 2:
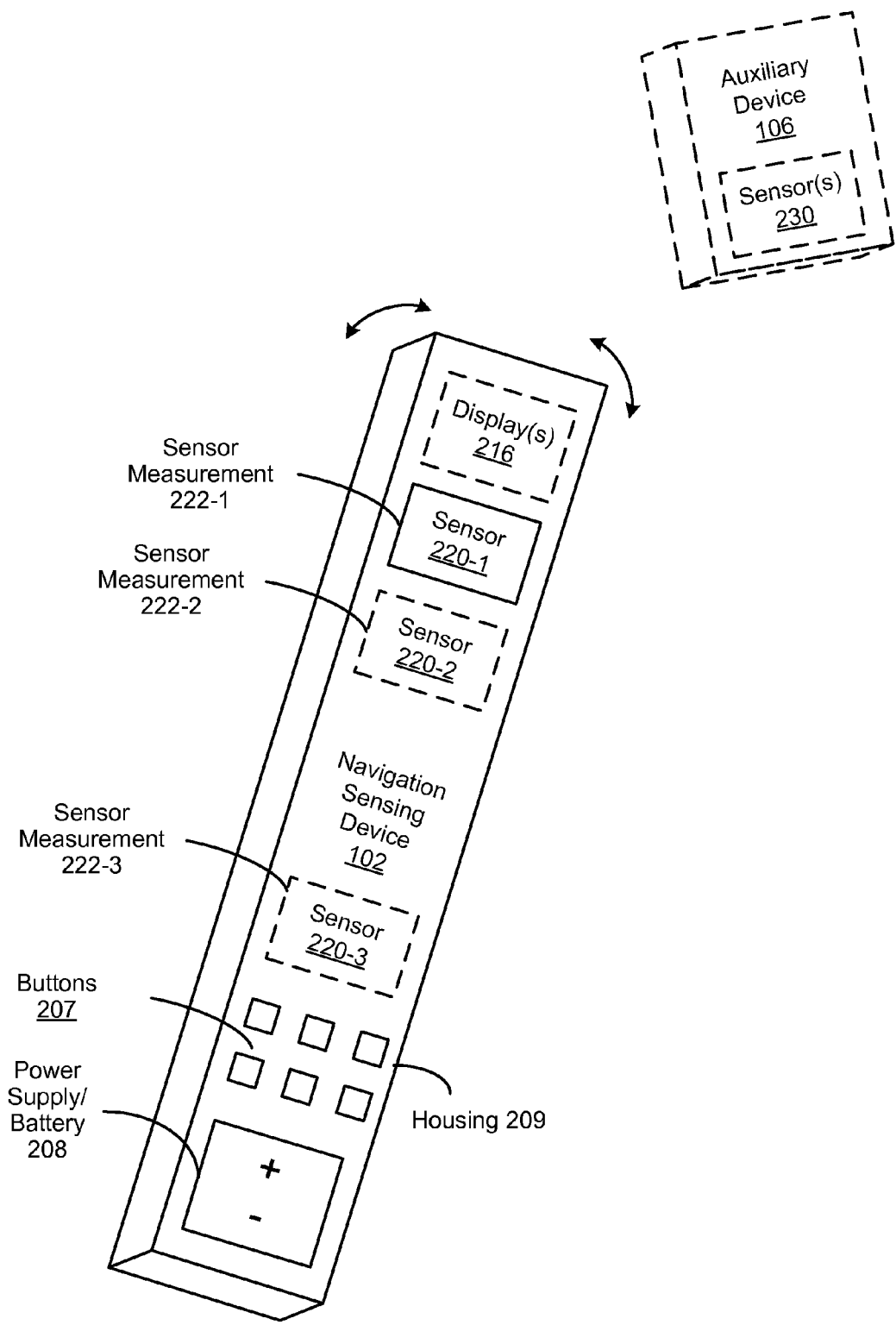
FIG. 2 is a block diagram illustrating an example navigation sensing device and auxiliary device, according to some embodiments.

Attention is now directed to FIG. 2, which illustrates an example of Device 102 and Auxiliary Device 106, according to some embodiments. In accordance with some embodiments, Device 102 includes one or more Sensors 220 which produce corresponding sensor outputs, which can be used to determine a state associated with Device 102 (e.g., a navigational state of the device, a user-device coupling state, a state of a user physically associated with the device and/or a state of an environment of the device). For example, in one implementation, Sensor 220-1 is a multi-dimensional magnetometer generating multi-dimensional magnetometer measurements (e.g., a rotation measurement), Sensor 220-2 is a multi-dimensional accelerometer generating multi-dimensional accelerometer measurements (e.g., a rotation and translation measurement), and Sensor 220-3 is a gyroscope generating measurements (e.g., either a rotational vector measurement or rotational rate vector measurement) corresponding to changes in orientation of the device. In some implementations Sensors 220 include one or more of gyroscopes, beacon sensors, inertial measurement units, temperature sensors, barometers, proximity sensors, single-dimensional accelerometers and multi-dimensional accelerometers instead of or in addition to the multi-dimensional magnetometer and multi-dimensional accelerometer and gyroscope described above. In accordance with some embodiments, Auxiliary Device 106 includes one or more Sensors 230 which produce corresponding sensor outputs, which can be used to determine a state associated with Auxiliary Device 106 (e.g., a navigational state of the device, a user-device coupling state, a state of a user physically associated with the device and/or a state of an environment of the device). In some implementations, information corresponding to the sensor outputs of Sensors 230 of Auxiliary Device 106 is transmitted to Device 102 for use in determining a state of Device 102. Similarly, in some implementations, information corresponding to the sensor outputs of Sensors 220 of Device 102 is transmitted to Auxiliary Device 106 for use in determining a state of Auxiliary Device 106. For example Device 102 is a telephone and Auxiliary Device 106 is a Bluetooth headset that is paired with the telephone, and the telephone and the Bluetooth headset share information based on sensor measurements to more accurately determine a state of Device 102 and/or Auxiliary Device 106. As another example two mobile telephones near each other can be configured to share information about their environmental context and/or their position. Additionally, a wrist watch with an accelerometer can be configured to share accelerometer measurements and/or derived posture information with a mobile telephone held by the user to improve posture estimates for the user.

In some embodiments, Device 102 also includes one or more of: Buttons 207, Power Supply/Battery 208, Camera 214 and/or Display 216 (e.g., a display or projector). In some embodiments, Device 102 also includes one or more of the following additional user interface components: one or more processors, memory, a keypad, one or more thumb wheels, one or more light-emitting diodes (LEDs), an audio speaker, an audio microphone, a liquid crystal display (LCD), etc. In some embodiments, the various components of Device 102 (e.g., Sensors 220, Buttons 207, Power Supply 208, Camera 214 and Display 216) are all enclosed in Housing 209 of Device 102. However, in implementations where Device 102 is a pedestrian dead reckoning device, many of these features are not necessary, and Device 102 can use Sensors 220 to generate tracking information corresponding changes in navigational state of Device 102 and transmit the tracking information to Host 101 wirelessly or store the tracking information for later transmission (e.g., via a wired or wireless data connection) to Host 101.

In some embodiments, one or more processors (e.g., 1102, FIG. 6) of Device 102 perform one or more of the following operations: sampling Sensor Measurements 222, at a respective sampling rate, produced by Sensors 220; processing sampled data to determine displacement; transmitting displacement information to Host 101; monitoring the battery voltage and alerting Host 101 when the charge of Battery 208 is low; monitoring other user input devices (e.g., keypads, buttons, etc.), if any, on Device 102 and, as appropriate, transmitting information identifying user input device events (e.g., button presses) to Host 101; continuously or periodically running background processes to maintain or update calibration of Sensors 220; providing feedback to the user as needed on the remote (e.g., via LEDs, etc.); and recognizing gestures performed by user movement of Device 102.

Attention is now directed to FIGS. 3A-3E, which illustrate configurations of various components of the system for generating navigational state estimates for a navigation sensing device. In some embodiments, there are three fundamental components to the system for determining a navigational state of a navigation sensing device described herein: Sensors 220, which provide sensor measurements that are used to determine a navigational state of Device 102, Measurement Processing Module 322 (e.g., a processing apparatus including one or more processors and memory) which uses the sensor measurements generated by one or more of Sensors 220 to generate estimates of the navigational state of Device 102 which can be used to determine current user interface data and/or track movement of Device 102 over time (e.g., using pedestrian dead reckoning), and, optionally, Display 104, which displays the currently displayed user interface to the user of Device 102 and/or information corresponding to movement of Device 102 over time. It should be understood that these components can be distributed among any number of different devices.

In some embodiments, Measurement Processing Module 322 (e.g., a processing apparatus including one or more processors and memory) is a component of the device including Sensors 220. In some embodiments, Measurement Processing Module 322 (e.g., a processing apparatus including one or more processors and memory) is a component of a computer system that is distinct from the device including Sensors 220. In some embodiments a first portion of the functions of Measurement Processing Module 322 are performed by a first device (e.g., raw sensor data is converted into processed sensor data at Device 102) and a second portion of the functions of Measurement Processing Module 322 are performed by a second device (e.g., processed sensor data is used to generate a navigational state estimate for Device 102 at Host 101).

Figure 3A:
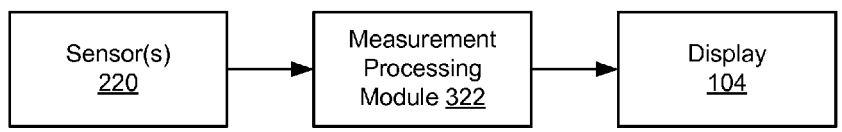
FIGS. 3A-3E are block diagrams illustrating configurations of various components of the system including a navigation sensing device, according to some embodiments.
Figure 3B:
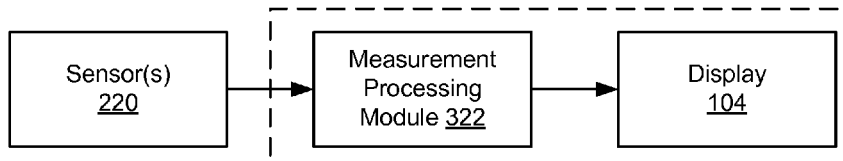
Figure 3C:
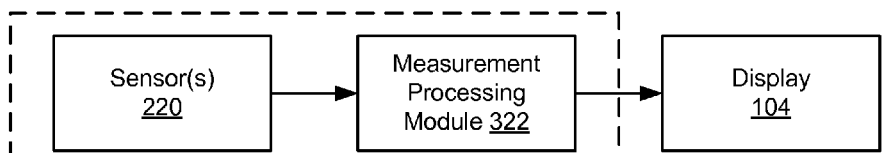

As one example, in FIG. 3A, Sensors 220, Measurement Processing Module 322 and Display 104 are distributed between three different devices (e.g., a navigation sensing device such as a multi-dimensional pointer, a set top box, and a television, respectively; or a motion tracking device, a backend motion processing server and a motion tracking client). As another example, in FIG. 3B, Sensors 220 are included in a first device (e.g., a multi-dimensional pointer or a pedestrian dead reckoning device), while the Measurement Processing Module 322 and Display 104 are included in a second device (e.g., a host with an integrated display). As another example, in FIG. 3C, Sensors 220 and Measurement Processing Module 322 are included in a first device, while Display 104 is included in a second device (e.g., a "smart" multi-dimensional pointer and a television respectively; or a motion tracking device such as a pedestrian dead reckoning device and a display for displaying information corresponding to changes in the movement of the motion tracking device over time, respectively).

Figure 3D:
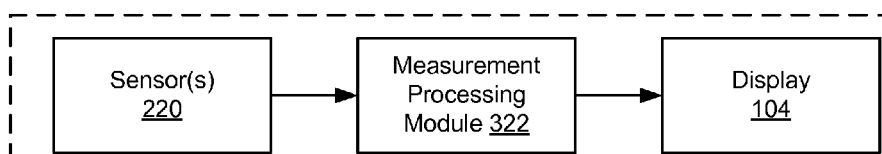
Figure 3E:
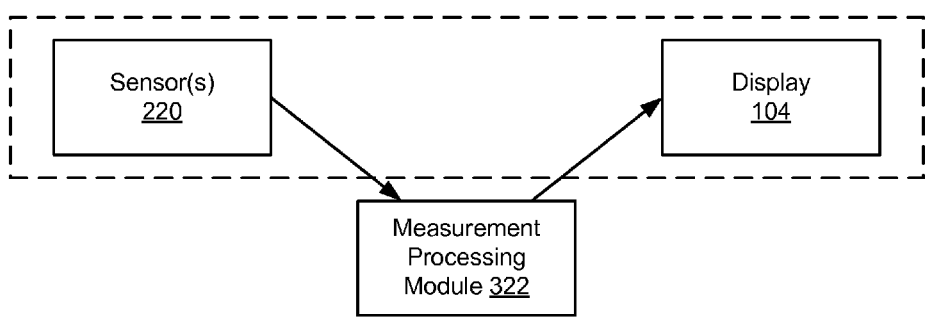

As yet another example, in FIG. 3D, Sensors 220, Measurement Processing Module 322 and Display 104 are included in a single device (e.g., a mobile computing device, such as a smart telephone, personal digital assistant, tablet computer, pedestrian dead reckoning device etc.). As a final example, in FIG. 3E, Sensors 220 and Display 104 are included in a first device (e.g., a game controller with a display/projector), while Measurement Processing Module 322 is included in a second device (e.g., a game console/server). It should be understood that in the example shown in FIG. 3E, the first device will typically be a portable device (e.g., a smart telephone or a pointing device) with limited processing power, while the second device is a device (e.g., a host computer system) with the capability to perform more complex processing operations, or to perform processing operations at greater speed, and thus the computationally intensive calculations are offloaded from the portable device to a host device with greater processing power. While a plurality of common examples have been described above, it should be understood that the embodiments described herein are not limited to the examples described above, and other distributions of the various components could be made without departing from the scope of the described embodiments.

Determining Device Context Information

Figure 4A:
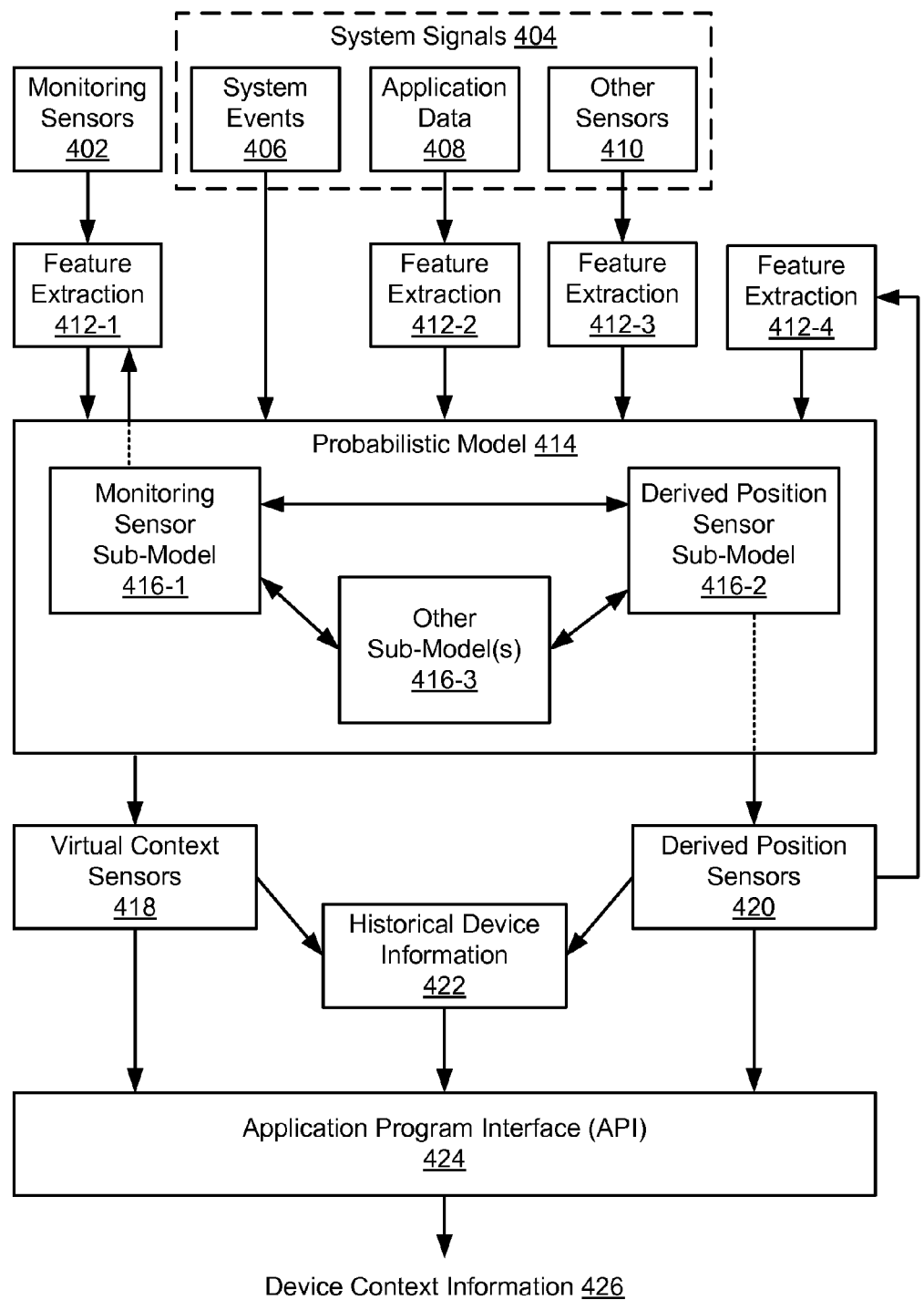
FIG. 4A-4C are diagrams illustrating an example of combining monitoring sensor measurements and system signals to determine device context, according to some embodiments.
Figure 4B:
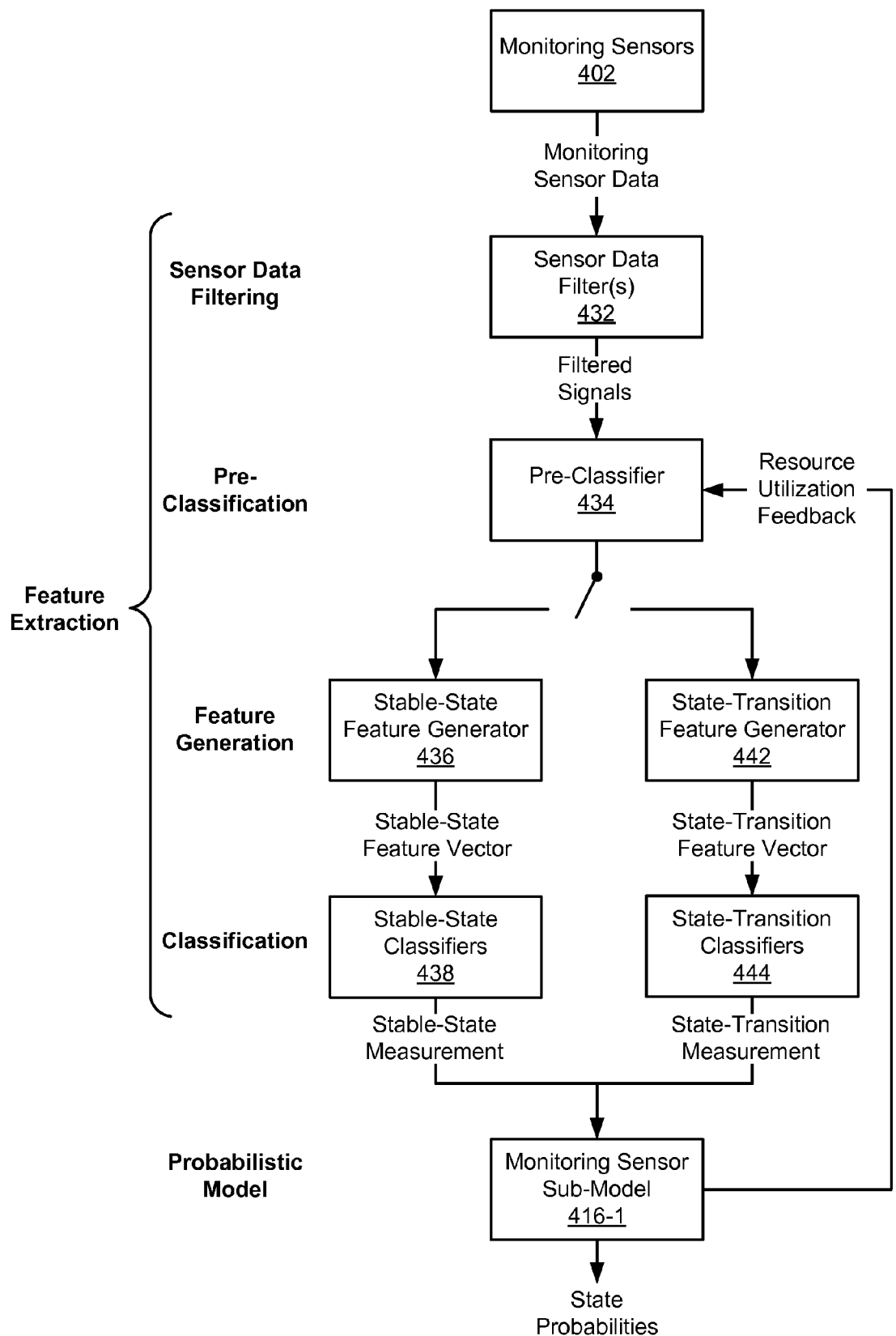
Figure 4C:
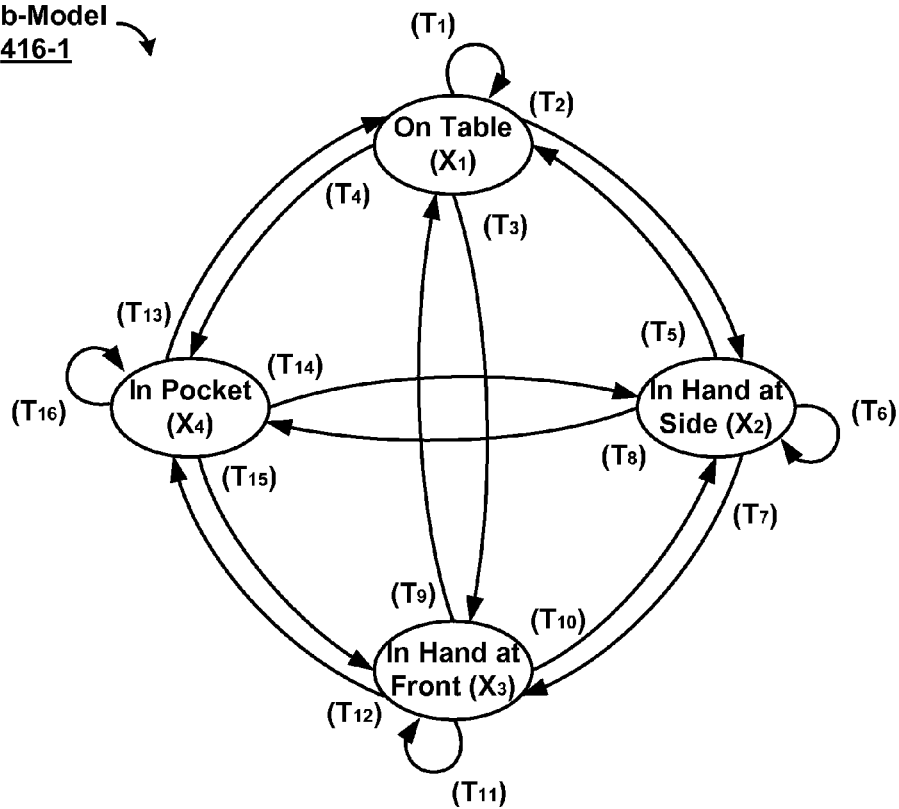
Figure 5A:
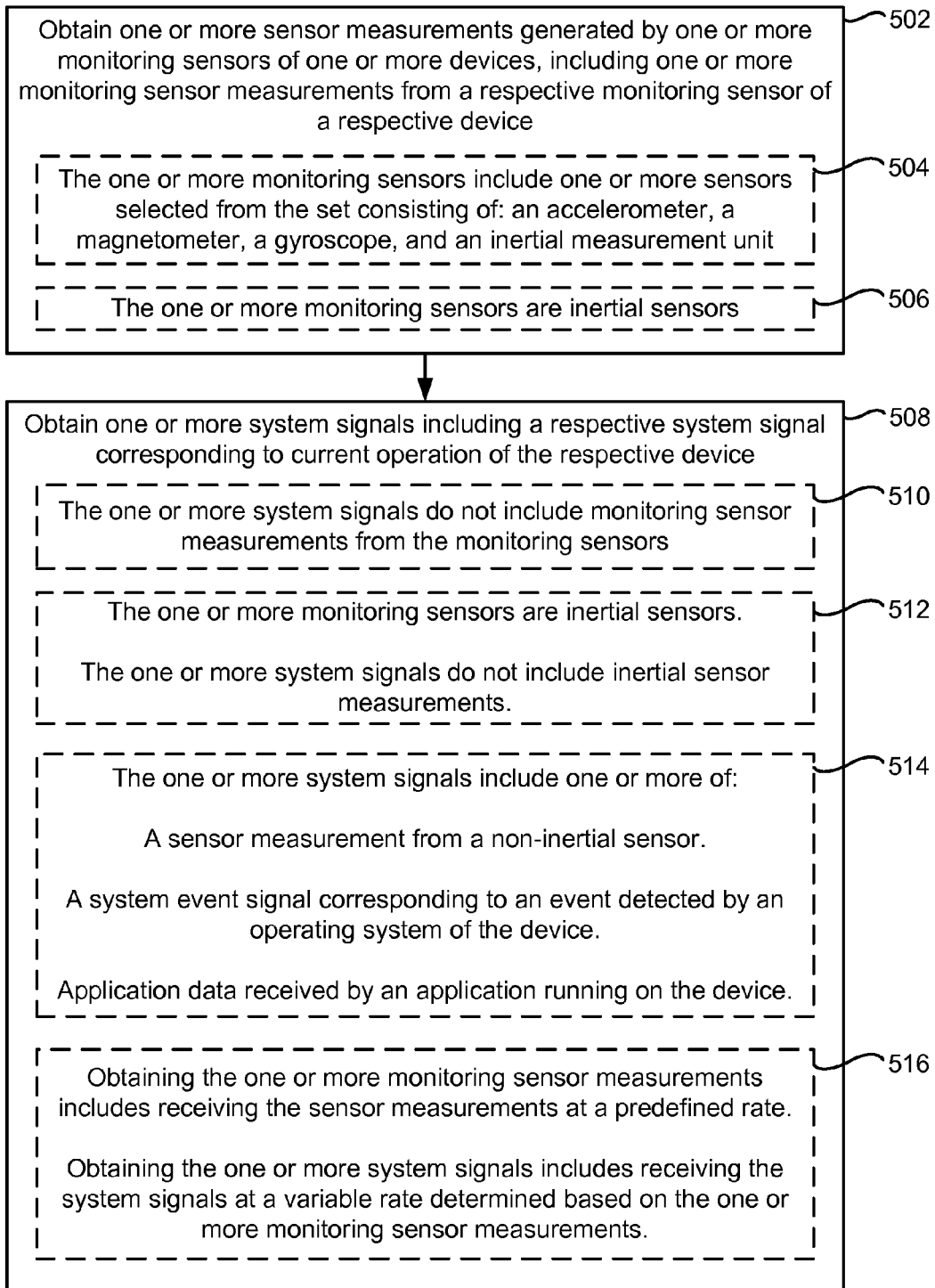
FIGS. 5A-5F are flow diagrams of a method for combining monitoring sensor measurements and system signals to determine device context, according to some embodiments.
Figure 5B:
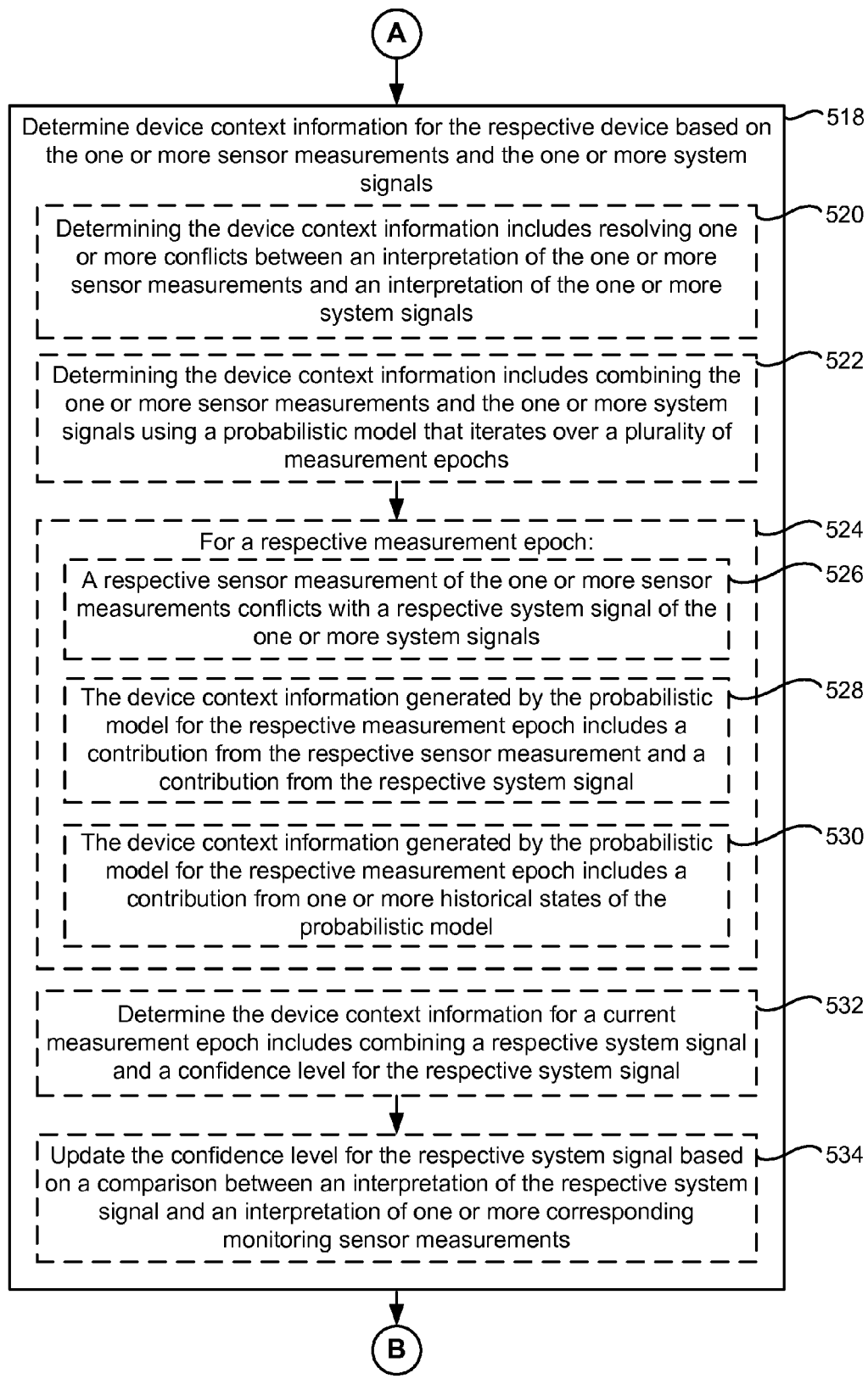
Figure 5C:
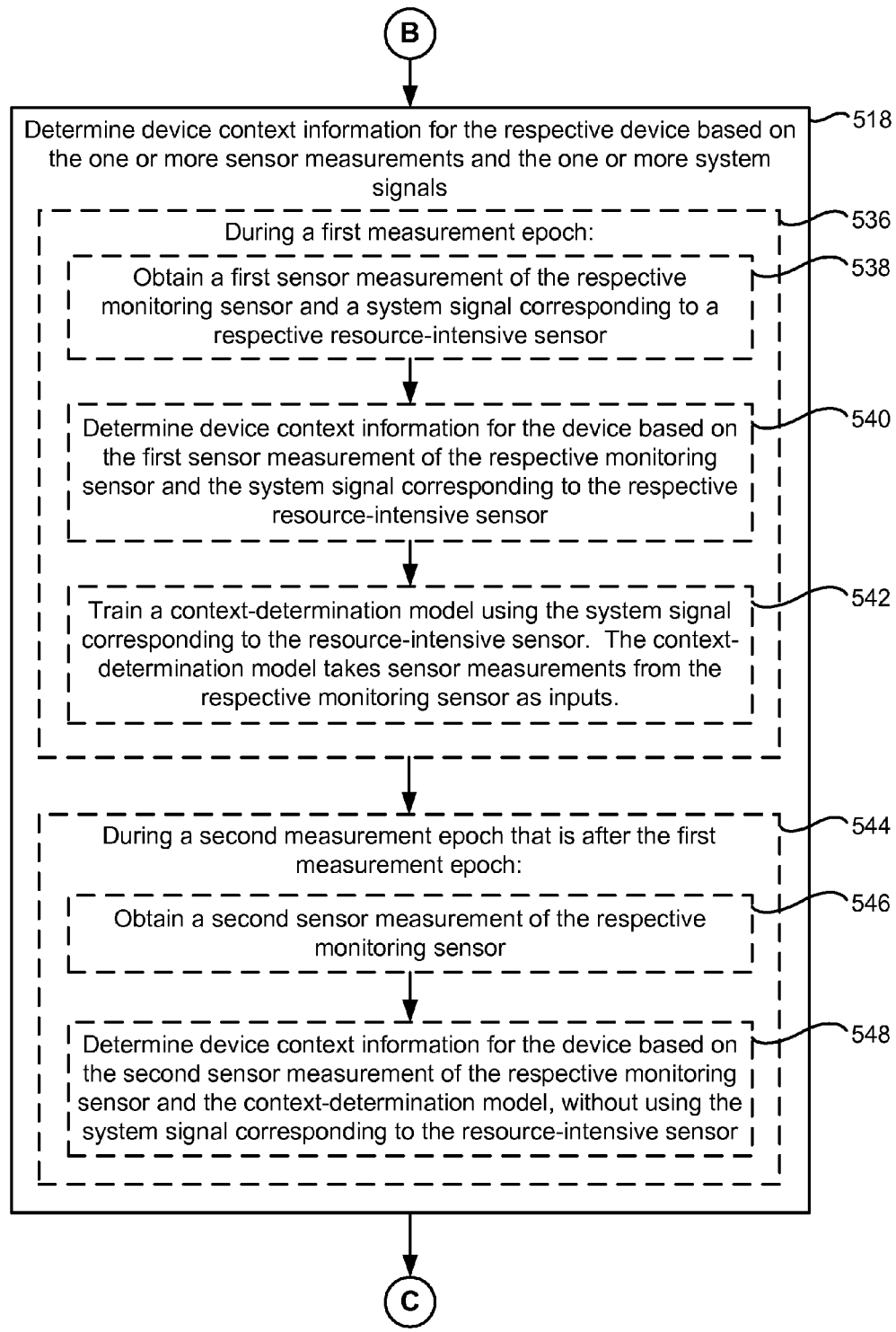
Figure 5D:
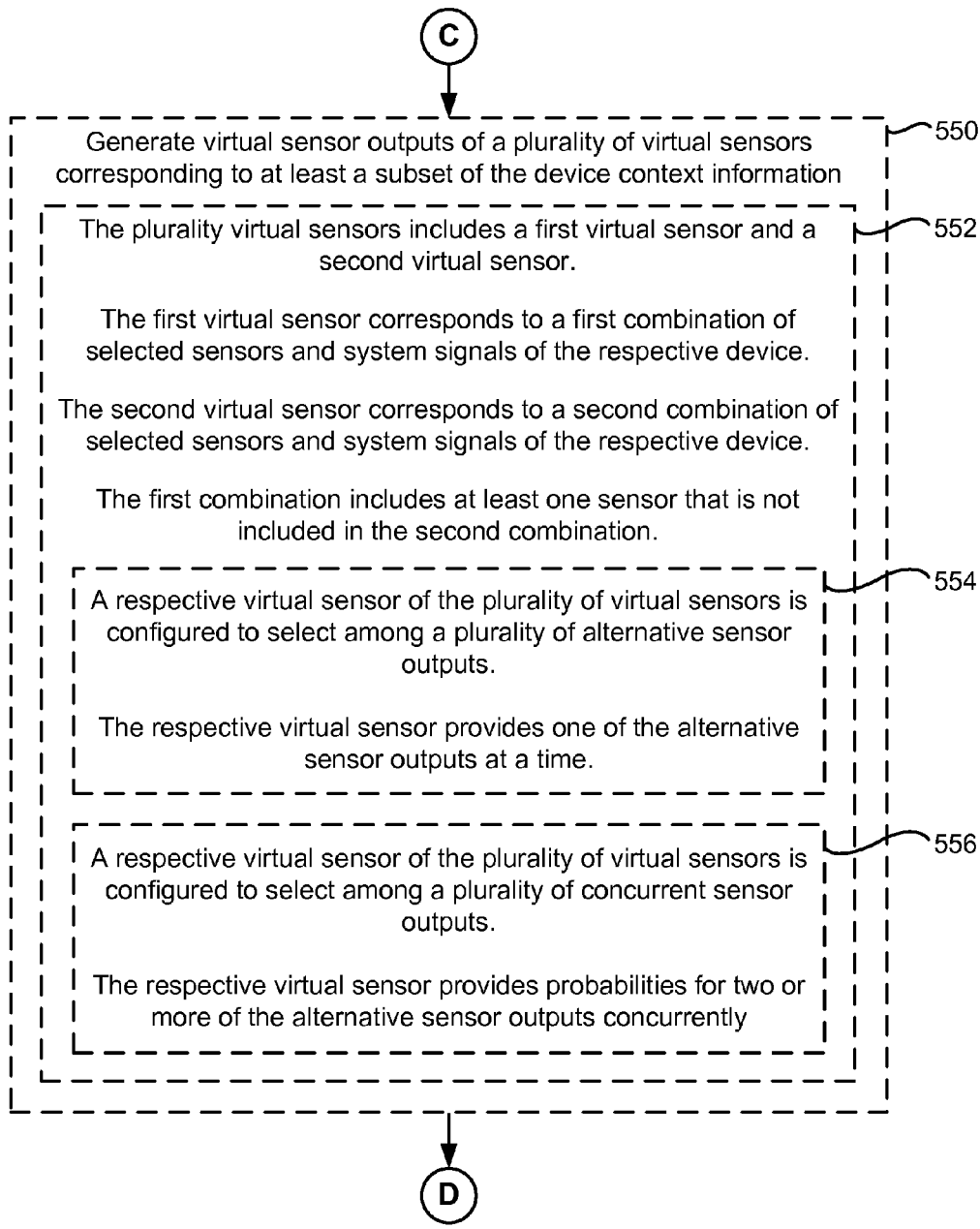
Figure 5E:
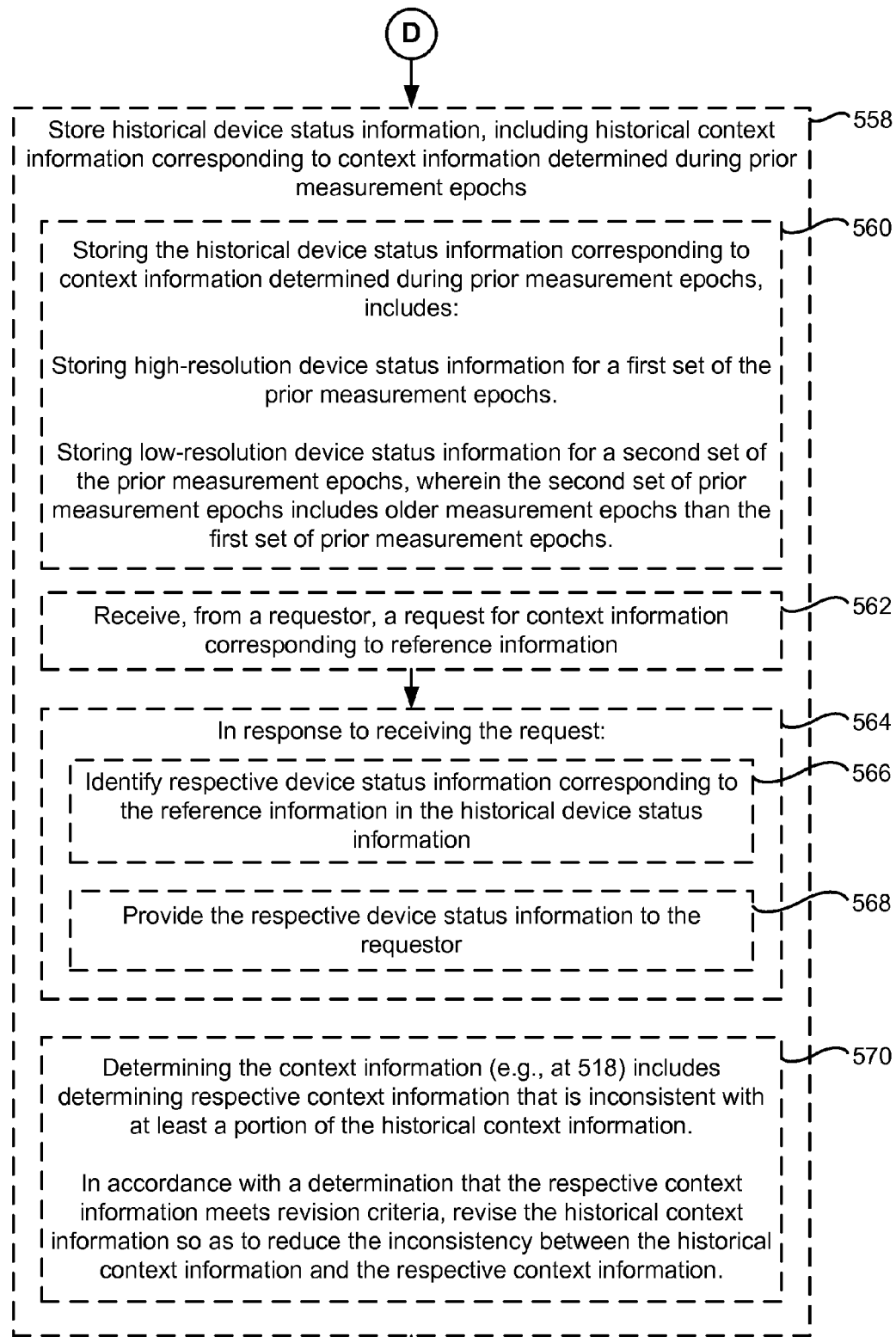
Figure 5F:
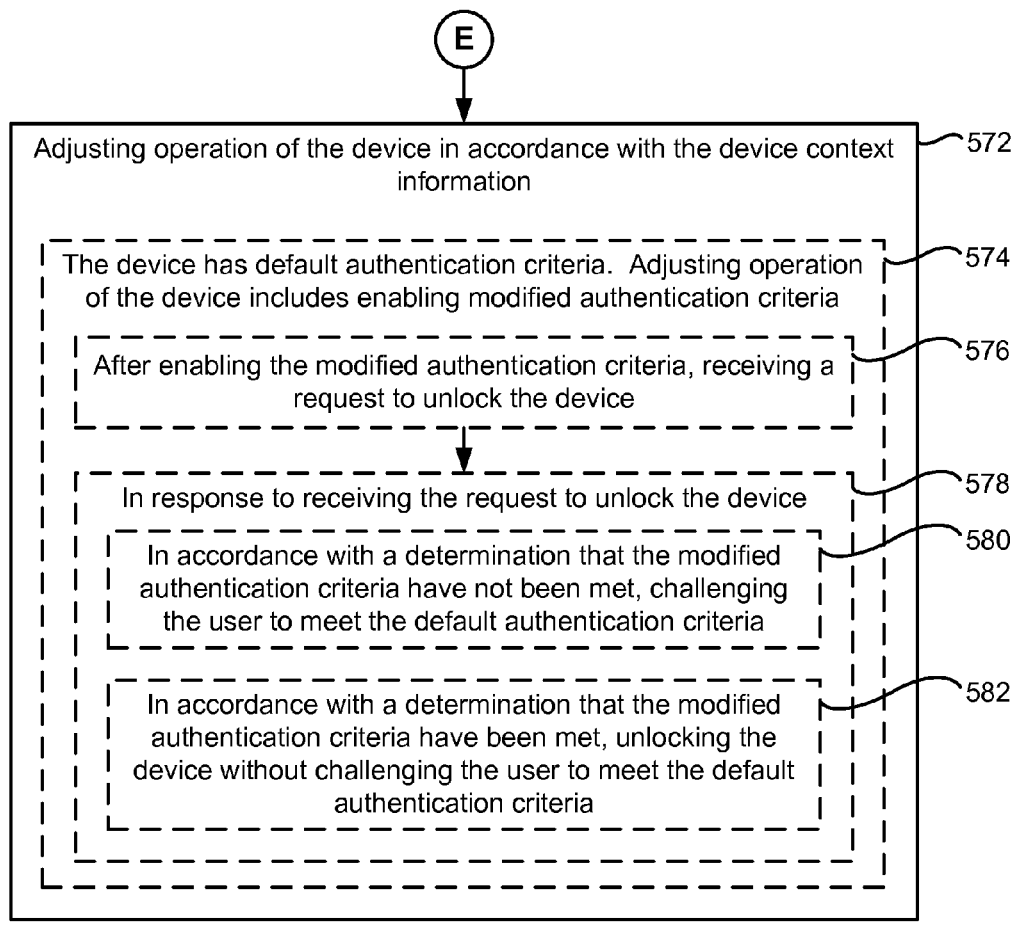

Attention is now directed to FIGS. 4A-4C, which include block diagrams illustrating an example of combining monitoring sensor measurements and system signals to determine device context, in accordance with some embodiments.

FIG. 4A illustrates an overview of a system for combining monitoring sensor measurements and system signals to determine device context. A processing apparatus obtains (e.g., based on sensor measurements of sensors associated with the device or an auxiliary device associated with the device) monitoring sensor measurements from Monitoring Sensors 402 and System Signals 404. In some implementations System Signals 404 include representations of System Events 406 (e.g., power on/off, plugged in state), representations of Application Data 408 (e.g., calendar, browsing history, telephone call history, check-ins) and sensor measurements from Other Sensors 410 (e.g., sensors other than Monitoring Sensors 402. In the example shown in FIG. 4A, the processing apparatus includes Feature Extractors 412 for extracting features from Monitoring Sensors 402, System Signals 404 and other received or derived inputs.

In some embodiments, the extracted features corresponding to these various sources are combined by a Probabilistic Model 414 (e.g., a Markov Model such as the Markov Model described below with reference to FIG. 4C). In some implementations, Probabilistic Model 414 includes one or more Sub-Models 416 that correspond to different sources of information. For example, in FIG. 4A, there is a Monitoring Sensor Sub-Model 416-1 that corresponds to device coupling states that are determined based on features extracted from sensor measurements of Monitoring Sensors 402, where Monitoring Sensor Sub-Model 416-1 optionally provides feedback to Feature Extraction Module 412-1 to adjust the rate and/or type of features generated by Feature Extraction Module 412-1, as described in greater detail below with reference to FIG. 4B. Similarly, in FIG. 4A, there are other sub-models, such as a Derived Position Sensor Sub-Model 416-2 that models a position of the device based on inputs from the Monitoring Sensors 402 and System Signals 404, and provides estimates of device position that are augmented by information other than directly measured position information. For example, absolute device position information from GPS or wireless triangulation is augmented with relative device position information such as pedestrian dead reckoning, inertial movement tracking, device check-ins or other input sources. In implementations where there are multiple Sub-Models 416 in Probabilistic Model 414, the sub-models optionally include one or more shared states and/or one or more linked states and thus the various sub-models can influence other sub-models directly or indirectly.

In FIG. 4A, Probabilistic Model 414 generates information (e.g., state probabilities) that can be used by context aware applications to operate in accordance with changing contexts at the device. For example, the device uses the outputs of Probabilistic Model 414 to generate Virtual Context Sensors 418 and Derived Position Sensors 420 (e.g., based on information from Derived Position Sensor Sub-Model 416-2). In some implementations some or all of the virtual context sensor information and derived position sensor information is stored at the device as Historical Device Information 422 for a predefined time period (e.g., 1 hour, 1 day, or some other reasonable period of time). This Historical Device Information 422 enables a context aware application to search the historical device information (e.g., to find a context of the device at a last time that the user was in possession of the device) and/or retrieve device context and/or device position information from a specified time period. For example, a context aware application that was inactive (e.g., suspended or off), can request information identifying changes in device context or location since the last time the application was active. This contextual information, including "sensor outputs" from Virtual Context Sensor 418, "sensor outputs" from Derived Position Sensors 420 and Historical Device Information 422 is, optionally, made available via Application Program Interface (API) 424, which provides a standard, documented, interface for third-party applications to access Device Context Information 426.

Implementations that determine device context information described below with reference to FIGS. 4B-4C are explained with reference to a particular example of determining a coupling state of a device (e.g., determining if and how a device is associated with an entity). However, it should be understood that the general principles described below are applicable to a variety of different states associated with a device (e.g., a navigational state of the device, a state of a user physically associated with the device and/or a state of an environment of the device) and other device contexts. FIG. 4B illustrates an overview of a method of determining probabilities of a state associated with the device based on raw sensor data (e.g., for use in updating Monitoring Sensor Sub-Model 416-1 in FIG. 4A), where an example of the feature extraction performed by Feature Extraction Module 412-1, shown in FIG. 4A, is performed by modules 432-444. During a sensor data filtering stage, raw sensor data from Monitoring Sensors 402 are converted into filtered signals by one or more Sensor Data Filters 432. During a pre-classification stage, a pre-classification of the state is determined by Pre-Classifier 434 based on the filtered signals, so as to determine whether to pass the filtered signals to a set of stable-state modules or to pass the filtered signals to a set of state-transition modules.

After the state has been pre-classified, if the pre-classification indicates that the device is likely in a stable-state, Stable-State Feature Generator 436 generates a stable-state feature vector from the filtered signals and passes the stable-state feature vector to one or more Stable-State Classifiers 438 which provide estimations of a probability that the device is associated with different states in Monitoring Sensor Sub-Model 416-1 (described in greater detail below with reference to the Markov Model described in FIG. 4C). Monitoring Sensor Sub-Model 416-1 combines estimations from Stable-State Classifiers 438 with historical probabilities based on prior state estimates and probabilities of transitions between the states of Monitoring Sensor Sub-Model 416-1. Monitoring Sensor Sub-Model 416-1 is subsequently used to produce state probabilities for states associated with the device (e.g., probabilities for whether the device is in a user's pocket or on a table) which, optionally affect probabilities of other states in Probabilistic Model 414 that are linked to states of Monitoring Sensor Sub-Model 416-1.

After the state has been pre-classified, if the pre-classification indicates that the device is likely in a state-transition, State-Transition Feature Generator 442 generates a state-transition feature vector from the filtered signals and passes the state-transition feature vector to one or more State-Transition Classifiers 444, which provide estimations of a probability of transitions between various states in Monitoring Sensor Sub-Model 416-1 (described in greater detail below with reference to the Markov Model described in FIG. 4C). Monitoring Sensor Sub-Model 416-1 uses the estimations from State-Transition Classifiers 444 to determine or adjust model transition probabilities for Monitoring Sensor Sub-Model 416-1. Monitoring Sensor Sub-Model 416-1 is subsequently used to produce state probabilities corresponding to states associated with the device (e.g., assigning a probability that the device is in a user's pocket and a probability that the device is on a table).

In some embodiments, there is resource utilization feedback from Monitoring Sensor Sub-Model 416-1 to Pre-Classifier 434 and information from Monitoring Sensor Sub-Model 416-1 is used to control Pre-Classifier 434. For example, if there is a high degree of certainty that the device is associated with a particular state and has been associated with that state for a long time (e.g., a device has been sitting on a table for the last 15 minutes), then Monitoring Sensor Sub-Model 416-1 optionally provides this information to Pre-Classifier 434 and Pre Classifier 434 uses this information to reduce the frequency with which measurement epochs (e.g., cycles of Pre-Classification, Feature Extraction and Classification) are performed.

Information about a device coupling state can be used for a variety of purposes at the device. For example, an estimate of a device coupling state can improve power management (e.g., by enabling the device to enter a lower-power state when the user is not interacting with the device). As another example, an estimate of a device coupling state can enable the device to turn on/off other algorithms (if the device is off Body, and thus is not physically associated with the user it would be a waste of energy for the device to perform step counting for the user). In some embodiments, the classification of device coupling includes whether the device is on Body or off Body, as well as the specific location of the device in the case that it is physically associated with the user (e.g., in a pocket, bag, the user's hand). Determinations about device coupling can be made by the device based on signatures present in small amplitude body motion as well as complex muscle tremor features that are distributed across X, Y and Z acceleration signals measured by the device. In some implementations, these signals are acquired at sampling rates of 40 Hz or greater.

In some embodiments, Sensor Data Filters 432 take in three axes of raw acceleration data and generate filtered versions of the acceleration data to be used in both Pre-Classifier 434 and either Stable-State Feature Generator 436 or State-Transition Feature Generator 442. One example of filtered signals used for user-device coupling are described in Table 1 below.

TABLE 1

Filtered Signals

| Filter Type | Filter Specifics |
|---|---|
| Low Pass | 0-2.5 Hz band. Uses 51 tap FIR (finite impulse response) filter. |
| High Pass | 1.5-20 Hz band. Uses 51 tap FIR filter. |
| Derivative Low Pass | Central difference derivative of low pass signal. |
| Envelope Derivative Low Pass | Uses a 31 tap Hilbert transform. The Hilbert transform produces complex analytic signal, and taking the magnitude of the analytic signal produces the envelope. |
| Envelope High Pass | Low pass filter the high pass using an 11 tap tent FIR filter. |

Pre-Classifier 434 is responsible for determining which types of features to generate (e.g., stable-state features or state-transition features), and passing an appropriate segment of sensor data (e.g., at least a subset of the filtered signals) to these feature generators (e.g., Stable-State Feature Generator 436 or State-Transition Feature Generator 442). In some embodiments, the determination of segment type is performed based on a combination of device motion context as well as based on features of the filtered signals generated by Sensor Data Filters 432.

In some embodiments, Pre-Classifier 434 serves as a resource allocation manager. For example, Pre-Classifier 434 allocates resources by specifying that one type of feature set is produced at a time (e.g., either producing stable-state features or state-transition features but not both). Additionally, in a situation where Pre-Classifier 434 determines that the device is in a stable-state (e.g., based on information from Monitoring Sensor Sub-Model 416-1), Pre-Classifier 434 manages the rate at which the device iterates through measurement epochs (e.g., a rate at which sets of filtered signals are sent to Stable-State Feature Generator 436). For example, if the model state has remained constant with high confidence for a predetermined amount of time (e.g., 1, 5, 10, 15 minutes, or a reasonable amount of time), the rate of the measurement epochs is decreased. Conversely, if a transition just occurred or if the model state is uncertain (e.g., the most likely model state has less than a predefined amount of certainty or the difference between the probability of the two most likely model states is below a predefined threshold), the rate of the measurement epochs is increased. In some embodiments, the provision of filtered signals to one of the feature generators (e.g., Stable-State Feature Generator 436 or State-Transition Feature Generator 442) determines whether or not the device is working to generate features from the filtered signals. As such, reducing or increasing the measurement epoch rate will have a corresponding effect on the overall processor utilization of the device, reducing the processor utilization when the device has been in the same state for a long time and increasing the processor utilization when the device has recently transitioned between states, which increases the overall energy efficiency of the device.

As one example (e.g., when a coupling state of the device is being determined), Pre-Classifier 434 determines whether to provide the filtered signals to Stable-State Feature Generator 436 or State-Transition Feature Generator 442 based on finding corresponding peaks in the low and high pass envelope signals indicative of sudden and/or sustained changes in motion of the device. The classifiers (e.g., Stable-State Classifiers 438 and/or State-Transition Classifiers 444) receive signal features. These features are extracted from either a state-transition or stable-state segment of low and high pass filtered signals (e.g., the filtered signals generated by Sensor Data Filters 432) provided by the Pre-Classifier 434. In some embodiments, the features used by Stable-State Classifiers 438 for stable-state classification differ from the features used by State-Transition Classifiers for state-transition classification, however both use the same underlying filtered signals produced by Sensor Data Filter(s) 432. For example, Stable-State Classifiers 438 use one or more of the Stable-State Features described in Table 2, below, while State-Transition Classifiers 444 use one or more of the State-Transition Features described in Table 3, below. It should be understood that the features described in Tables 2 and 3 are not an exhaustive list but are merely examples of features that are used in some embodiments.

TABLE 2

Stable-State Features

| Feature | Signal Processing to Derive Feature |
|---|---|
| Tilt Angle | Mean of the absolute values of the derivative of the low pass signals |
| Tilt Variation and High Frequency Variation | Variance of the low and high pass signals. |
| Coordinated Movement (low pass) | Correlation of the XY, XZ and YZ zero-mean low pass filtered signals. |
| Coordinated Movement (high pass) | Correlation of the XY, XZ and YZ envelope of the high pass filtered signals. |
| Variability in Signal Bandwidth | Hjorth mobility for X, Y and Z where Hjorth mobility is calculated from the power of the first derivative of the high pass signal scaled by the variance of the high pass signal. |

TABLE 2-continued

Stable-State Features

| Feature | Signal Processing to Derive Feature |
|---|---|
| Signal Bandwidth | Hjorth purity for X, Y and Z where Hjorth purity is calculated from the square of the power of the first derivative of the high pass signal scaled by the product of the variance of the high pass signal and the power of the second derivative of the high pass signal. |
| Spectral Energy | Normalized power of the spectrum of the high pass signal and normalized spectral bins, 4 Hz in width, between 0 and 20 Hz. Normalization of the power is based on training subject distribution and bin normalization is based on the power of the subjects given time segment. |

In some embodiments, the term "Hjorth mobility" used in Table 2 corresponds to the square root of a value produced by comparing (1) the variance of the rate of change of movement in a respective direction (e.g., the y direction) and (2) the variance of the amount of movement in the respective direction (e.g., using Equation 1, below)

$$\text{Hjorth Mobility} = \sqrt{\frac{\text{Var}\left(\frac{dy}{dt}\right)}{\text{Var}(y)}} \quad (1)$$

In some embodiments, the term "Hjorth purity" used in Table 2 corresponds to the square root of a result produced by performing a comparison between (1) the square of the variance of the rate of change of movement in a respective direction (e.g., the y direction) and (2) the product of the variance of the amount of movement in the respective direction and the variance of the acceleration in the respective direction (e.g., as shown in Equation 2, below)

$$\text{Hjorth Purity} = \sqrt{\frac{\left(\text{Var}\left(\frac{dy}{dt}\right)\right)^2}{\text{Var}(y)\text{Var}\left(\frac{d^2 y}{dt^2}\right)}} \quad (2)$$

TABLE 3

State-Transition Features

| Feature | Signal Processing to Derive Feature |
|---|---|
| Tilt Angle and Tilt Variation | Mean and variance of the low pass filtered signals. |
| Coordinated motion (low pass, mutual information) | Mutual information between XY, XZ and YZ pairs of low pass filtered signals. |
| Coordinated motion (high pass, mutual information) | Mutual information between XY, XZ and YZ pairs of envelope of high pass filtered signals. |
| Coordinated motion (low pass, correlation) | Correlation of the XY, XZ and YZ zero-mean low pass filtered signals. |
| Coordinated motion (high pass, correlation) | Correlation of the XY, XZ and YZ envelope of the high pass filtered signals. |
| Max Energy and Time of Max Energy | Peak amplitude and normalized time to peak of the envelope of the high pass signal. |
| Spectral Energy | Dominant modes of the spectrum of the high pass signal. |
| Tilt Variation Extrema and Associated Time | Signed peak amplitude and normalized time to peak of the derivative of the low pass signal. |

FIG. 4C illustrates an example of a probabilistic model which defines the specific set of states associated with the device. In the example illustrated in FIG. 4C, the probabilistic model (e.g., Monitoring Sensor Sub-Model 416-1) is a Markov Model. While four states (e.g., "On Table," "In Hand at Side," "In Hand at Front," and "In Pocket," which in this example are virtual sensor measurements for a virtual "device coupling state" sensor) are shown in FIG. 4C, it should be understood that, in principle Monitoring Sensor Sub-Model 416-1 could have any number of states. In some embodiments, the probabilistic model imposes logical constraints on the transition between the states, preventing infeasible events such as going from "On Table" to "In Pocket" without first going through "In Hand at Side" (e.g., the transition probability $P(T_4)$ from $X_1$ to $X_4$ is set to zero). The same set of states and transitions are used when the device is in a stable state and when the device is in a state transition. When the device is in a stable state, output from Stable-State Classifiers 438 is used to update the state probabilities of Monitoring Sensor Sub-Model 416-1, optionally, without updating the model transition probabilities. In contrast, when the device is in a state transition, output from the State-Transition Classifiers 444 is used to update the model transition probabilities are changed from P to P'.

The use of a probabilistic model for determining device state increases the robustness of the overall classification and allows for improved management of resource utilization. In terms of robustness, the probabilistic model (e.g., Monitoring Sensor Sub-Model 416-1) incorporates the idea that the past provides information about the future. For example, the longer the device goes without observing a transition between states, the more confident the device is that a current state associated with the device is constant (unchanging with time). In addition, if recent observations have all indicated the same respective state associated with the device, the probabilistic model (e.g., Monitoring Sensor Sub-Model 416-1) will have a high probability of the respective state being the current state and thus will assign a lower probability on other states. This assignment of probabilities effectively places a lower weight on new measurements that indicate a different state from the respective state, which reduces the likelihood that outlier sensor measurements will result in state misclassifications. In terms of resource utilization, the probabilistic model is, optionally, used to adapt the update rate of the underlying classifiers based on the current confidence level (probability) of one or more of the states (e.g., each state). In particular, as a confidence level in a current state increases, the update rate of the stable state measurements (e.g., the frequency of measurement epochs) is, optionally, decreased until a transition measurement occurs, at which point the update rate increases again.

Monitoring Sensor Sub-Model 416-1 has two different modes of operation, a stable-state update mode of operation for use when Pre-Classifier 434 does not detect a transition between states and a state-transition update mode of operation for use when Pre-Classifier 434 detects a transition between states. In the stable-state updated mode, a Stable-State Markov Model Transition Matrix 450 is used. In the state-transition updated mode, a State-Transition Markov Model Transition Matrix 452 is used.

A stable-state update of Monitoring Sensor Sub-Model 416-1 is invoked by an updated Stable-State Classifier 438 output. The update consists of two parts, a motion update (e.g., equation 3, below) and a measurement update (e.g., equation 4, below):

$$\tilde{P}(X_{i,t}) = \sum_{j=1}^{n} P(X_{i,t} \mid X_{j,t-1}) P(X_{j,t-1}) \quad (3)$$

Equation 3 updates the model states, where $\tilde{P}(X_{i,t})$ is the model-predicted probability of state $X_i$ at time t, which is calculated by adding up the probabilities that the state transitioned from other states $X_j$ to state $X_i$. In equation 3, the probability that state $X_j$ transitioned to state $X_i$ is based on a state-transition matrix $P(X_{i,t}|X_{j,t-1})$ (e.g., Stable-State Markov Model Transition Matrix 450 in FIG. 4C) that specifies a probability of transition between state $X_j$ and state $X_i$ and a probability $P(X_{j,t-1})$ of state $X_j$ being a current state associated with the device at a prior time step.

After determining the model-predicted probability, a combined probability is determined based on the model-predicted probability and a measurement probability based on the Stable-State Classifier 438 outputs (e.g., using equation 4).

$$P(X_{i,t}) = \alpha P(X_{i,t}|y_t)\tilde{P}(X_{i,t}) \quad (4)$$

Equation 4 computes a combined probability of model states, where $P(X_{i,t})$ is the combined probability of state $X_i$ at time t, which is calculated by combining the model-predicted probability of state $X_i$ at time t, $\tilde{P}(X_{i,t})$, with a measurement probability, $P(X_{i,t}|y_t)$, that is computed directly by Stable-State Classifiers 438. In Equation 4, above, $\alpha$ is a scaling parameter. The elements in the state transition matrix, $P(X_{i,t}|X_{j,t-1})$, are deterministic and defined based on a given model. When the elements of the state transition matrix are other than 1's and 0's, this component of the model allows for diffusion of the probabilities over time (e.g., over sequential measurement epochs). In other words, in some situations, without any observations (e.g., contributions from measurement probability $P(X_{i,t}|y_t)$), this component will eventually lead to lower certainty in Monitoring Sensor Sub-Model 416-1 states over time.

In contrast, the state-transition update of Monitoring Sensor Sub-Model 416-1 is invoked by an updated State-Transition Classifier 444 output. The update involves first computing transition probabilities for P' based on State-Transition Classifier 444 outputs and prior model state probabilities (e.g., as shown in equation 5, below), and then updating the model state probability accordingly (e.g., as shown in equation 6, below). It is effectively a motion update with a modified state transition matrix built from the outputs of the transition classifiers.

$$P'(X_{i,t} \mid X_{j,t-1}) = \sum_{k=1}^{m} P(X_{i,t} \mid T_{k,t}) P(T_{k,t} \mid X_{j,t-1}) \quad (5)$$

Equation 5 computes a modified transition matrix, where $P'(X_{i,t}|X_{j,t-1})$ (e.g., State-Transition Markov Model Transition Matrix 452 in FIG. 4C) is the measurement-based state transition matrix which includes elements corresponding to updated transition probability for a transition from state $X_j$ to state $X_i$, which is calculated based on a measurement transition probability $P(T_{k,t}|X_{j,t-1})$, that is computed directly by State-Transition Classifiers 444. In some embodiments, the updated transition probability is the same as the measurement transition probabilities computed by State-Transition Classifiers 444. In some embodiments, the measurement transition probabilities are modified by a transition definition matrix $P(X_{i,t}|T_{k,t})$ that defines how transitions relate to each other and the model states. In a simple model, the elements of the transition definition matrix are 1's and 0's, which encode the arrows shown in Monitoring Sensor Sub-Model 416-1 in FIG. 4C. For example, P(Table|OnTableFromPocket)=1, while P(Pocket|OnTableFromPocket)=0 (for a ToTable transition, the probability that the next state is table is 100%, whereas the probability that the next state is anything else is 0%). In still more complex models (e.g., where there are dependencies between the probabilities of transitioning between different states of the probabilistic model, the transition definition matrix can have elements with values between 1 and 0 that encode these more complex dependencies).

After determining the modified state transition matrix, probabilities of the states of Monitoring Sensor Sub-Model 416-1 are updated using the modified state transition matrix (e.g., using equation 6) to determine updated probabilities for the model states of Monitoring Sensor Sub-Model 416-1.

$$P(X_{i,t}) = \sum_{j=1}^{n} P'(X_{i,t} \mid X_{j,t-1}) P(X_{j,t-1}) \quad (6)$$

Equation 6 updates the model states, where $P(X_{i,t})$ is the model-predicted probability of state $X_i$ at time t, which is calculated by adding up the probabilities that the state transitioned from other states $X_j$ to state $X_i$. In contrast to equation 3, in equation 6, the probability that state $X_j$ transitioned to state $X_i$ is based on a measurement-based state transition matrix $P'(X_{i,t}|X_{j,t-1})$ that specifies a probability of transitioning between state $X_j$ and state $X_i$ in accordance with the output of State-Transition Classifiers 444. The measurement-based state transition matrix is combined with the probabilities $P(X_{j,t-1})$ of states $X_j$ being a current state associated with the device to generate updated model-predicted probabilities for the various model states.

For example, if State-Transition Classifiers 444 indicate that it was almost certain that the device transitioned from On Table to In Hand at Front, then $P'(T_3)$ (also referred to as $P'(X_{3,t}|X_{1,t-1})$) will be increased to approximately 1 and any probability that the device was in the On Table state at the prior time step will flow to a probability the device is In Hand at Front at the next time step. Thus, if in the prior time step there was a high probability (e.g., approximately 1) that the device was On Table, then there will be a substantially increased probability that the device is in the In Hand at Front state at the next time step. In contrast, if there was a relatively low probability (e.g., approximately 0) that the device was in the On Table state at the prior time step, then there will be relatively little contribution to a change in the probability that the device is in the In Hand at Front state at the next time step due to a flow of probability from the On Table state. In this example, the error correction benefits of Monitoring Sensor Sub-Model 416-1 are illustrated, as a single erroneously identified transition (e.g., a transition that corresponds to a transition from a state that is not a current state of the device) will have very little impact on the overall model state probabilities, while a correctly identified transition (e.g., a transition that corresponds to a transition from a state that is a current state of the device) will enable the device to quickly switch from a prior state to a next state.

Attention is now directed to FIGS. 5A-5F, which illustrate a method 500 for combining monitoring sensor measurements and system signals to determine device context, in accordance with some embodiments. Method 500 is, optionally, governed by instructions that are stored in a non-transitory computer readable storage medium and that are executed by one or more processors of one or more computer systems (e.g., Device 102, FIG. 6 or Host 101, FIG. 7). Each of the operations shown in FIGS. 5A-5F typically corresponds to instructions stored in a computer memory or non-transitory computer readable storage medium (e.g., Memory 1110 of Device 102 in FIG. 6 or Memory 1210 of Host 101 in FIG. 7). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 500 are combined and/or the order of some operations is changed from the order shown in FIGS. 5A-5F.

The following operations are performed at a processing apparatus having one or more processors and memory storing one or more programs that, when executed by the one or more processors, cause the respective processing apparatus to perform the method. In some embodiments, the processing apparatus is a component of Device 102 (e.g., the processing apparatus includes the one or more CPU(s) 1102 in FIG. 6). In some embodiments, the processing apparatus is separate from Device 102 (e.g., the processing apparatus includes the one or more CPU(s) 1202 of a host system 101, an example of which is shown in FIG. 7).

The processing apparatus obtains (502) one or more sensor measurements generated by one or more monitoring sensors of one or more devices, including one or more monitoring sensor measurements from a respective monitoring sensor of a respective device. In some embodiments, the one or more monitoring sensors include (504) one or more sensors selected from the set consisting of: an accelerometer, a magnetometer, a gyroscope, and an inertial measurement unit. In some embodiments, the one or more monitoring sensors are (506) inertial sensors (e.g., accelerometers, gyroscopes and inertial measurement units).

The processing apparatus also obtains (508) one or more system signals including a respective system signal corresponding to current operation of the respective device. In some embodiments, the one or more system signals include a remote system signal corresponding to current operation of an auxiliary device that is associated with the respective device (e.g., a Bluetooth headset that is paired with a mobile telephone). In some embodiments, wherein the one or more monitoring sensors include one or more sensors selected from the set consisting of: an accelerometer, a magnetometer, a gyroscope, and an inertial measurement unit, the one or more system signals do not include (510) monitoring sensor measurements from the monitoring sensors. In some embodiments, where the one or more monitoring sensors are inertial sensors, the one or more system signals do not include (512) inertial sensor measurements.

In some embodiments, the one or more system signals include (514) one or more of: a sensor measurement from a non-inertial sensor; (e.g., a camera, a global positioning system receiver, a wireless communication receiver, a speaker, a microphone, a pressure sensor, a humidity sensor, and an ambient temperature sensor); a system event signal corresponding to an event detected by an operating system of the device (e.g., screen tap, ring, vibrate, the device being connected to a power source); and application data received by an application running on the device (e.g., a calendar event, browsing history of a web browser, email history of an email application, messaging history of an electronic messaging application, voicemail, telephone calls, and/or check-ins of a social networking application).

In some embodiments, obtaining the one or more monitoring sensor measurements includes receiving (516) the sensor measurements at a predefined rate (e.g., the monitoring sensor measurements are used to constantly monitor the device while the device is on) and obtaining the one or more system signals includes receiving the system signals at a variable rate determined based on the one or more monitoring sensor measurements (e.g., the system signals are obtained more frequently when the monitoring sensor measurements indicate that something interesting is happening with the device). In some embodiments, although the monitoring sensor measurements are received at a predefined rate, they are not used to determine device context information at the predefined rate. Rather, in some embodiments, the monitoring sensor measurements are used at least in part to determine a rate at which the monitoring sensor measurements and system signals are used to determined device context information for the device (e.g., a model update rate at which a probabilistic model generates outputs for virtual sensors is different from the predefined rate and, optionally, the model update rate is controlled based on the monitoring sensor measurements). For example, for the Monitoring Sensor Sub-Model 416-1 in FIGS. 4A-4C is updated at a rate determined by Pre-Classifier 434 in FIG. 4B, which acts as a resource manager in some circumstances, as described in greater detail above.

After obtaining the sensor measurements generated by the one or more monitoring sensors and the system signals, the processing apparatus determines (518) device context information for the respective device based on the one or more sensor measurements and the one or more system signals. An example of determining device context information that includes coupling status information associated with the device is described in greater detail above with reference to FIGS. 4A-4C.

In some embodiments, determining the device context information includes resolving one or more conflicts between an interpretation of the one or more sensor measurements and an interpretation of the one or more system signals (e.g., the one or more sensor measurements tend to support classification of the device context as a first context (e.g., "user sitting"), while the one or more system signals tend to support classification of the device context as a second context different from the first context (e.g., "user walking"). In situations where the first context and the second context are incompatible (e.g., a user cannot simultaneously be walking and sitting), the processing apparatus, optionally, generates a combined interpretation that takes into account the differing interpretations. In some implementations resolving these conflicting interpretations includes determining which competing interpretation is more likely to be accurate (e.g., by evaluating other supporting information from other sources and/or evaluating confidence in the interpretations of the sensor measurements and the system signals) and selecting one of the contexts as the combined interpretation. In some implementations, resolving these conflicting interpretations includes passing through (e.g., providing to an application) information indicative of the conflicting interpretations and an associated probability of the different interpretations being correct (e.g., the user is walking with a 70% probability and sitting with a 30% probability). Generating a combined interpretation from conflicting interpretations improves the reliability of the combined interpretation by providing a more accurate estimation of uncertainty regarding a current context (e.g., if two sources are in agreement in the interpretation of device context, then the device context is more likely to be certain than if two sources are not in agreement as to the interpretation of device context). For example, in some implementations, an application is configured not to enter a context specific mode of operation if the uncertainty of the current context is above a predefined threshold (e.g., more than 40%, 30%, 20%, 10%, 5%, or 1% uncertainty)

In some embodiments, determining the device context information includes combining (522) the one or more sensor measurements and the one or more system signals using a probabilistic model (e.g., Probabilistic Model 414 in FIG. 4A) that iterates over a plurality of measurement epochs. In some of these embodiments, for (524) a respective measurement epoch: a respective (monitoring) sensor measurement of the one or more sensor measurements conflicts (526) with a respective system signal of the one or more system signals; and the device context information generated by the probabilistic model for the respective measurement epoch includes (528) a contribution from the respective (monitoring) sensor measurement and a contribution from the respective system signal. For example, Probabilistic Model 414 uses features extracted from Motion Sensors 402 and System Signals 404 to update probabilities of states in a Markov Model and uses these probabilities to generate a combined interpretation of the sensor measurements from Monitoring Sensors 402 and System Signals 404. In some of these embodiments, the device context information generated by the probabilistic model for the respective measurement epoch includes (530) a contribution from one or more historical states of the probabilistic model. For example Monitoring Sensor Sub-Model 416-1 takes into account past probabilities of states of the model when updating the model based on new sensor measurements, as described in greater detail above with reference to FIGS. 4B-4C. For example if the user was "walking" with 90% certainty in the previous measurement epoch, it is more likely that the user is still "walking" than if the user had been "sitting" with 90% certainty in the previous measurement epoch.

In some embodiments, determining the device context information for a current measurement epoch includes combining (532) a respective system signal and a confidence level for the respective system signal and the processing apparatus updates (534) the confidence level for the respective system signal (e.g., for a subsequent measurement epoch) based on a comparison between an interpretation of the respective system signal and an interpretation of one or more corresponding monitoring sensor measurements. Thus, in some embodiments, the confidence level of the respective system signal is determined based on historical information from monitoring sensors (e.g., unreliable signals are slowly degraded over time). For example, if a respective system signal says that a telephone was raised to a user's ear (e.g., because a call was accepted), but monitoring sensors indicate that the telephone was not moved (e.g., because a call was accepted but the user talked via speakerphone or Bluetooth headset), a confidence level of the respective system signal would be reduced for future device context information determinations.

In some embodiments, where the device context information is determined in a plurality of measurement epochs, during (536) a first measurement epoch, the processing apparatus obtains (538) a first sensor measurement of the respective monitoring sensor and a system signal corresponding to a respective resource-intensive sensor; and the processing apparatus determines (540) device context information for the device based on the first sensor measurement of the respective monitoring sensor and the system signal corresponding to the respective resource-intensive sensor. During the first measurement epoch, the processing apparatus also trains (542) a context-determination model using the system signal corresponding to the resource-intensive sensor, where the context-determination model takes sensor measurements from the respective monitoring sensor as inputs. In some of these embodiments, during (544) a second measurement epoch that is after the first measurement epoch: the processing apparatus obtains (546) a second sensor measurement of the respective monitoring sensor and, optionally, forgoes obtaining a system signal corresponding to the respective resource-intensive sensor (e.g., because the context-determination model was trained in the first measurement epoch). During the second measurement epoch, the processing apparatus also determines (548) device context information for the device based on the second sensor measurement of the respective monitoring sensor and the context-determination model, without using the system signal corresponding to the resource-intensive sensor. In some embodiments, as the context-determination model for interpreting sensor measurements of the respective monitoring sensor becomes more accurate, the processing apparatus does not need to rely on resource-intensive system signals as heavily. For example, initially, the processing apparatus uses a camera (with a high power use profile) and accelerometers (with a low power use profile) to determine if user is looking at the device (e.g., a telephone), but once a sensor model for detecting whether the user is looking at the telephone using only accelerometers (e.g., via changes in tremor patterns) is trained, the processing apparatus can rely on accelerometers and the sensor model to determine whether the user is looking at the device without using the camera.

In some embodiments, the processing apparatus generates (550) virtual sensor outputs of a plurality of virtual sensors corresponding to at least a subset of the device context information. In some of these embodiments, the plurality virtual sensors includes a first virtual sensor and a second virtual sensor; the first virtual sensor corresponds to a first combination of selected sensors and system signals of the respective device; and the second virtual sensor corresponds to a second combination of selected sensors and system signals of the respective device. In some of these embodiments, the first combination includes at least one sensor that is not included in the second combination. In some embodiments, the second virtual sensor takes the output of one or more other virtual sensors (e.g., a third virtual sensor as inputs). For example, the virtual sensor UserIdentity which produces outputs "isOwnerPresent" and "isOwnerNotPresent" would be built from a combination of the virtual sensor outputs from virtual sensor Carry (with outputs including: "on Body," "off Body," in Pocket," and "in Hand at Side"), system signals associated with identity verification (e.g., a system signal indicating that the user has entered their pass code), and, optionally, inertial sensor signal classifications as well that identify a person's unique tremor patterns. Other examples of virtual sensors include: a BodyPosture virtual sensor which produces outputs "isWalking", "isSitting", "isStanding", "isRunning;" a Transport virtual sensor which produces outputs "isInCar", "isInElevator", "isOnTrain", "isOnEscalator;" a DeviceMotion virtual sensor which produces outputs "isDeviceRotating", "isDeviceTranslating;" and a UserMotion virtual sensor which produces outputs "isUserRotating", "isUserTranslating."

In some embodiments, the virtual sensors and virtual sensor outputs are selected without regard to the sensors and system signals that are available from the respective device. For example, for a first device with a first plurality of sensors and a second device with a second plurality of sensors different from the first plurality of sensors, the same virtual sensors and virtual sensor outputs are generated, so that an application developer who takes the virtual sensor outputs as inputs for an application can use the same virtual sensor outputs for the application even when two different devices have different sensors. In particular, some useful sensors that are included in some navigation devices are excluded from others due to cost, power usage or other considerations. For example, a first device has a proximity sensor while a second device does not have a proximity sensor. In this example, instead of developing two different applications, one which determines device coupling state with a proximity sensor and one that determines device orientation without a proximity sensor, the application developer can simply rely on a virtual sensor that outputs "in Hand at Side" "in Hand at Front" "on Table" "in Pocket" and takes the proximity sensor into account when it is available and compensates for the lack of proximity sensor when it is not available and thus the application developer does not need to design different applications for different devices with different sets of sensors.

In some embodiments, a respective virtual sensor of the plurality of virtual sensors is (554) configured to select among a plurality of alternative sensor outputs and the respective virtual sensor provides one of the alternative sensor outputs at a time (e.g., the respective virtual sensor outputs a binary device state, such as a state indicating either that a known user is in possession of the device or that an unknown user is in possession of the device). In some embodiments, a respective virtual sensor of the plurality of virtual sensors is (556) configured to select among a plurality of concurrent sensor outputs and the respective virtual sensor provides probabilities for two or more of the alternative virtual sensor outputs concurrently (e.g., the respective virtual sensor outputs a multiple device states and corresponding state probabilities, such as a plurality of state indicating that the device is "off Body" with a 20% probability and "in Pocket" with an 80% probability).

In some embodiments, the processing apparatus stores (558), on non-transitory computer readable storage medium, historical device status information (e.g., Historical Device Information 422 in FIG. 4A), including historical context information corresponding to context information determined during prior measurement epochs. In some embodiments, the historical device status information also includes system signals and information indicating changes in context information during the prior measurement epochs. In some embodiments, where historical device status information is stored, storing the historical device status information corresponding to context information determined during prior measurement epochs includes storing (560) high-resolution device status information for a first set of the prior measurement epochs (e.g., storing all of the sensor measurements for measurement epochs occurring in the last hour) and storing low-resolution device status information for a second set of the prior measurement epochs, wherein the second set of prior measurement epochs includes older measurement epochs than the first set of prior measurement epochs. In some embodiments, the device stores a detailed history of sensor measurements and context information for the last hour (e.g., all sensor measurements and all state changes are stored for the last hour) and stores only a sparse history of sensor measurements and context information for a longer time period (e.g., device state changes are stored for the last six hours without storing the corresponding sensor measurements).

In some embodiments, where historical device status information (e.g., Historical Device Information 422 in FIG. 4A) is stored, the processing apparatus receives (562), from a requestor, a request for context information corresponding to reference information (e.g., a particular time or a detected event such as when a user stopped using the device). In some of these embodiments, in response (564) to receiving the request, the processing apparatus identifies (566) respective device status information corresponding to the reference information in the historical device status information; and provides (568) the respective device status information to the requestor. In some embodiments, the device status information corresponding to the reference information includes a time of last use of the device (e.g., to help a user find a lost telephone). In some embodiments, the device status information corresponding to the reference information includes information concerning changes in device state at a time relative to the time of last use (e.g., the device was placed onto a table just after the user stopped using it). In some embodiments, the device status information corresponding to the reference information includes information concerning system signals detected at a time relative to the time of last use (e.g., the device was plugged into a power cable just before the user stopped using it). Providing this information to the user can be very helpful to a user (e.g., when the user is looking for a lost telephone, it may be very helpful to know that the device is located on a table and/or is currently plugged in).

In some embodiments, where historical device status information (e.g., Historical Device Information 422 in FIG. 4A) is stored, determining the context information includes determining respective context information that is inconsistent with at least a portion of the historical context information and in accordance with a determination that the respective context information meets revision criteria, (e.g., the respective context information has a very high probability of being accurate) the processing apparatus revises (570) the historical context information so as to reduce the inconsistency between the historical context information and the respective context information. In contrast, in accordance with a determination that the revision criteria have not been met, the historical context information is not revised. In some embodiments, reducing the inconsistency between the historical context information and the respective context information includes changing the historical context information so that it is consistent with the respective context information. In some implementations, the processing apparatus revises the historical context information based on high probability current context information that contradicts historical context information. For example, the processing apparatus inserts a transition from sitting to standing in historical context information if user starts walking when the historical context information indicated that the user was sitting at the time that the user started walking In some embodiments, in accordance with a determination that the respective context information does not meet revision criteria, (e.g., the respective context information has a low probability of being accurate) the processing apparatus forgoes revision of the historical context information. As another example, if the processing apparatus determines that a user is walking, the processing apparatus optionally reviews prior data to identify any steps that occurred before the processing apparatus determined that the user was walking; subsequently, the processing apparatus performs pedestrian dead reckoning calculations starting with the first identified step, which is, in many situations, a step that occurred before the device had determined that the user was walking. Thus, in some circumstances, revising the historical device context information can improve the accuracy or efficiency of the device (e.g., by accurately identifying a beginning point of the user's walking, thereby improving a PDR estimation of the position of the device).

After determining the device context information, the processing apparatus adjusts (572) operation of the device in accordance with the device context information. In some implementations, the device context information is determined by a context monitoring application and is provided to a user interface application (e.g., an application developed by a third party that did not develop the context monitoring application), and the user interface application changes operation of the device or another device associated with the device in accordance with the device context information provided by the context monitoring application.

In some embodiments, the device has default authentication criteria (e.g., requirement of a pass code to unlock the device), and adjusting operation of the device includes enabling (574) modified authentication criteria (e.g., requirement of a continuous chain of possession from last input of pass code to unlock the device). In some of these embodiments, after enabling the modified authentication criteria, the processing apparatus receives (578) a request to unlock the device, and in response (578) to receiving the request to unlock the device: in accordance with a determination that the modified authentication criteria have not been met, the processing apparatus challenges (580) the user to meet the default authentication criteria. In contrast, in accordance with a determination that the modified authentication criteria have been met, the processing apparatus unlocks (582) the device without challenging the user to meet the default authentication criteria. For example if the processing apparatus is reasonably certain (e.g., 90%, 99% certain) that a telephone has been in a user's pocket since it was last unlocked with a pass code, then the device is unlocked without requiring the pass code (e.g., because the device has not changed possession since the user was last authenticated to the device).

It should be understood that the particular order in which the operations in FIGS. 5A-5F have been described are merely exemplary and are not intended to indicate that the described order is the only order in which the operations could be performed. One of ordinary skill in the art would recognize various ways to reorder the operations described herein.

System Structure

Figure 6:
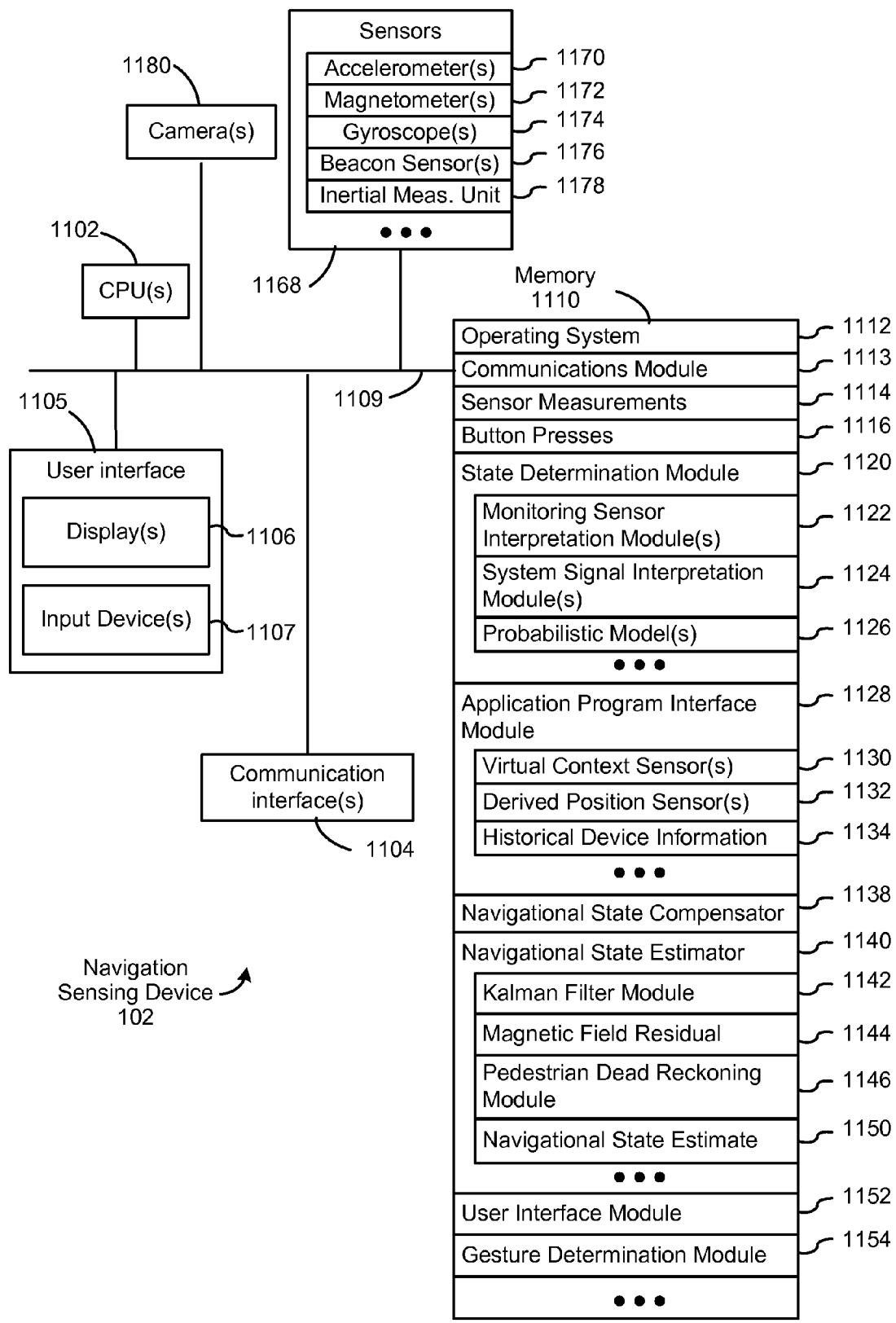
FIG. 6 presents a block diagram of an example navigation sensing device, according to some embodiments.
Figure 7:
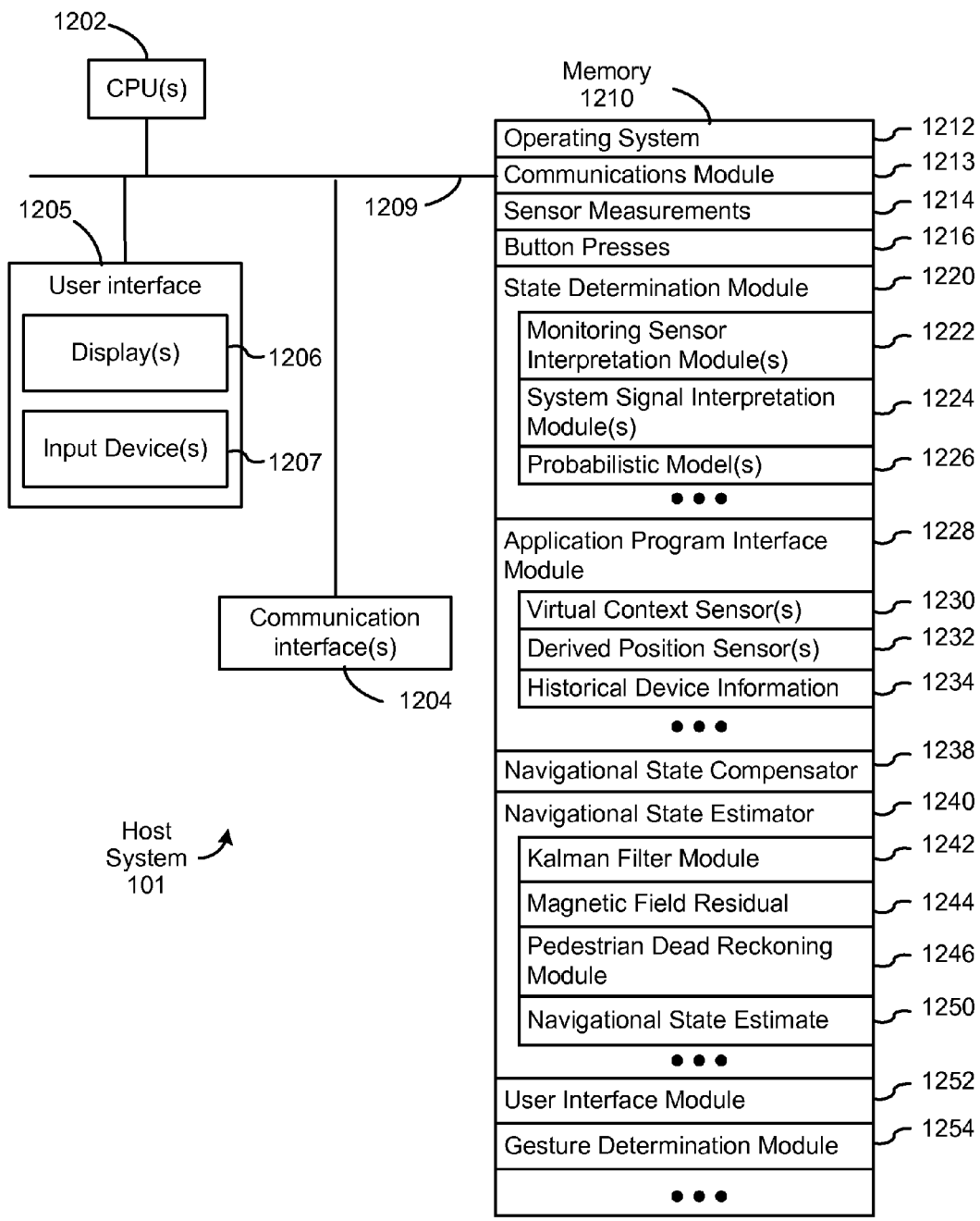
FIG. 7 presents a block diagram of an example host computer system, according to some embodiments.

FIG. 6 is a block diagram of Navigation sensing Device 102 (herein "Device 102"). Device 102 typically includes one or more processing units (CPUs) 1102, one or more network or other Communications Interfaces 1104 (e.g., a wireless communication interface, as described above with reference to FIG. 1), Memory 1110, Sensors 1168 (e.g., Sensors 220 such as one or more Accelerometers 1170, Magnetometers 1172, Gyroscopes 1174, Beacon Sensors 1176, Inertial Measurement Units 1178, Thermometers, Barometers, and/or Proximity Sensors, etc.), one or more Cameras 1180, and one or more Communication Buses 1109 for interconnecting these components. In some embodiments, Communications Interfaces 1104 include a transmitter for transmitting information, such as accelerometer and magnetometer measurements, and/or the computed navigational state of Device 102, and/or other information to Host 101. Communication buses 1109 typically include circuitry (sometimes called a chipset) that interconnects and controls communications between system components. Device 102 optionally includes user interface 1105 comprising Display 1106 (e.g., Display 104 in FIG. 1) and Input Devices 1107 (e.g., keypads, buttons, etc.). Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 optionally includes one or more storage devices remotely located from the CPU(s) 1102. Memory 1110, or alternately the non-volatile memory device(s) within Memory 1110, comprises a non-transitory computer readable storage medium. In some embodiments, Memory 1110 stores the following programs, modules and data structures, or a subset thereof:

- Operating System 1112 that includes procedures for handling various basic system services and for performing hardware dependent tasks;
- Communication Module 1113 that is used for connecting Device 102 to Host 101 and/or Device 106 via Communication Network Interface(s) 1104 (wired or wireless); Communication Module 1113 is optionally adapted for connecting Device 102 to one or more communication networks, such as the Internet, other wide area networks, local area networks, metropolitan area networks, and so on;
- Sensor Measurements 1114 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);
- data representing Button Presses 1116;
- State Determination Module 1120 for determining device context information for Device 102 (e.g., a state of Device 102 such as a navigational state and/or a state of an environment in which Device 102 is currently located), optionally including:
  - one or more Monitoring Sensor Interpretation Modules 1122 (e.g., Feature Extraction Module 412-1 in FIG. 4A) for converting sensor measurements from the monitoring sensors into information that is compatible with Probabilistic Model 1126;
  - one or more System Signal Interpretation Modules 1124 (e.g., Feature Extraction Modules 412-2 and 412-3 in FIG. 4A) for converting sensor measurements from the system signals into information that is compatible with Probabilistic Model 1126; and
  - Probabilistic Model 1126 (e.g., Probabilistic Model 414) for updating probabilities of device contexts (e.g., device states, device environment states, and/or device user states) associated with Device 102 in accordance with model state probabilities, model transition probabilities and input information from Monitoring Sensor Interpretation Modules 1122 and System Signal Interpretation Modules 1124; optionally, the information from Monitoring Sensor Interpretation Modules 1122 and System Signal Interpretation Modules 1124 is used to perturb or adjust a Markov Model as described in greater detail above with reference to FIGS. 4B-4C;
- Application Program Interface Module 1128 (e.g., Application Program Interface 424 in FIG. 4A), for providing access to device context information via a set of consistent and documented protocols so as to enable a number of different applications to efficiently and effectively access device context information and adjust operation of the device or other devices in accordance with that information, optionally including:
  - one or more Virtual Context Sensors 1130 (e.g., Virtual Context Sensors 418 in FIG. 4A) for providing organized device context information where an application can subscribe to changes in a particular type of device context information (e.g., by subscribing to changes in a particular virtual context sensor) or can request information regarding a current device context;
  - one or more Derived Position Sensors 1132 (e.g., Derived Position Sensors 420 in FIG. 4A) for providing device position information that includes contributions from sources other than absolute positioning sensors (e.g., inertial sensor information filtered through Probabilistic Model 1126); and
  - Historical Device Information 1134 (e.g., Historical Device Information 422 in FIG. 4A) for storing a record of device context information (e.g., storing past virtual sensor measurements corresponding to Virtual Context Sensors 1130) and device position information (e.g., storing past virtual sensor measurements corresponding to Derived Position Sensors 1132) and making this information available to applications via Application Program Interface Module 1128;
- Navigational State Compensator 1138 for determining a fixed compensation (e.g., a rotational offset) for compensating for drift in the navigational state estimate;
- Navigation State Estimator 1140 for estimating navigational states of Device 102, optionally including:
  - Kalman Filter Module 1142 that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector 2 in Equation 10 of U.S. Pat. Pub. No. 2010/0174506), a mapping, Kalman filter matrices, and attitude estimates (e.g., the attitude estimates as obtained from the quaternion in the state vector 2 in Equation 10 of U.S. Pat. Pub. No. 2010/0174506);
  - Magnetic Field Residual 1144 that is indicative of a difference between a magnetic field detected based on measurements from Magnetometer(s) 1172 and a magnetic field estimated based on Kalman Filter Module 1142;
  - Pedestrian Dead Reckoning Module 1146, for determining a direction of motion of the entity and updating a position of the device in accordance with the direction of motion of the entity, stride length, and stride count (additional details regarding pedestrian dead reckoning can be found in A. Jimenez, F.

Seco, C. Prieto, and J. Guevara, "A comparison of Pedestrian Dead-Reckoning algorithms using a low-cost MEMS IMU," IEEE International Symposium on Intelligent Signal Processing 26-28 Aug. 2009, p. 37-42, which is incorporated herein by reference in its entirety); and data representing Navigational State Estimate 1150 (e.g., an estimate of the position and/or attitude of Device 102).

optionally, User Interface Module 1152 that receives commands from the user via Input Device(s) 1107 and generates user interface objects in Display(s) 1106 in accordance with the commands and the navigational state of Device 102, User Interface Module 1152 optionally includes one or more of: a cursor position module for determining a cursor position for a cursor to be displayed in a user interface in accordance with changes in a navigational state of the navigation sensing device, an augmented reality module for determining positions of one or more user interface objects to be displayed overlaying a dynamic background such as a camera output in accordance with changes in a navigational state of the navigation sensing device, a virtual world module for determining a portion of a larger user interface (a portion of a virtual world) to be displayed in accordance with changes in a navigational state of the navigation sensing device, a pedestrian dead reckoning module for tracking movement of Device 102 over time, and other application specific user interface modules; and optionally, Gesture Determination Module 1154 for determining gestures in accordance with detected changes in the navigational state of Device 102.

It is noted that in some of the embodiments described above, Device 102 does not include a Gesture Determination Module 1154, because gesture determination is performed by Host 101. In some embodiments described above, Device 102 also does not include State Determination Module 1120, Navigational State Estimator 1140 and User Interface Module because Device 102 transmits Sensor Measurements 1114 and, optionally, data representing Button Presses 1116 to a Host 101 at which a navigational state of Device 102 is determined.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1102). The above identified modules or programs (i.e., sets of instructions) need not be implemented as separate software programs, procedures or modules, and thus various subsets of these modules may be combined or otherwise re-arranged in various embodiments. In some embodiments, Memory 1110 may store a subset of the modules and data structures identified above. Furthermore, Memory 1110 may store additional modules and data structures not described above.

Although FIG. 6 shows a "Navigation sensing Device 102," FIG. 6 is intended more as functional description of the various features which may be present in a navigation sensing device. In practice, and as recognized by those of ordinary skill in the art, items shown separately could be combined and some items could be separated.

FIG. 7 is a block diagram of Host Computer System 101 (herein "Host 101"). Host 101 typically includes one or more processing units (CPUs) 1202, one or more network or other Communications Interfaces 1204 (e.g., any of the wireless interfaces described above with reference to FIG. 1), Memory 1210, and one or more Communication Buses 1209 for interconnecting these components. In some embodiments, Communication Interfaces 1204 include a receiver for receiving information, such as accelerometer and magnetometer measurements, and/or the computed attitude of a navigation sensing device (e.g., Device 102), and/or other information from Device 102. Communication Buses 1209 optionally include circuitry (sometimes called a chipset) that interconnects and controls communications between system components. Host 101 optionally includes a User Interface 1205 comprising a Display 1206 (e.g., Display 104 in FIG. 1) and Input Devices 1207 (e.g., a navigation sensing device such as a multi-dimensional pointer, a mouse, a keyboard, a trackpad, a trackball, a keypad, buttons, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 optionally includes one or more storage devices remotely located from the CPU(s) 1202. Memory 1210, or alternately the non-volatile memory device(s) within Memory 1210, comprises a non-transitory computer readable storage medium. In some embodiments, Memory 1210 stores the following programs, modules and data structures, or a subset thereof:

Operating System 1212 that includes procedures for handling various basic system services and for performing hardware dependent tasks;

Communication Module 1213 that is used for connecting Host 101 to Device 102 and/or Device 106, and/or other devices or systems via Communication Network Interface(s) 1204 (wired or wireless), and for connecting Host 101 to one or more communication networks, such as the Internet, other wide area networks, local area networks, metropolitan area networks, and so on;

Sensor Measurements 1214 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);

data representing Button Presses 1216;

State Determination Module 1220 for determining device context information for Device 102 (e.g., a state of Device 102 such as a navigational state and/or a state of an environment in which Device 102 is currently located), optionally including:

one or more Monitoring Sensor Interpretation Modules 1222 (e.g., Feature Extraction Module 412-1 in FIG. 4A) for converting sensor measurements from the monitoring sensors into information that is compatible with Probabilistic Model 1226;

one or more System Signal Interpretation Modules 1224 (e.g., Feature Extraction Modules 412-2 and 412-3 in FIG. 4A) for converting sensor measurements from the system signals into information that is compatible with Probabilistic Model 1226; and Probabilistic Model 1226 (e.g., Probabilistic Model 414) for updating probabilities of device contexts (e.g., device states, device environment states, and/or device user states) associated with Device 102 in accordance with model state probabilities, model transition probabilities and input information from Monitoring Sensor Interpretation Modules 1222 and System Signal Interpretation Modules 1224; optionally, the information from Monitoring Sensor Interpretation Modules 1222 and System Signal Interpretation Modules 1224 is used to perturb or adjust a Markov Model as described in greater detail above with reference to FIGS. 4B-4C;

Application Program Interface Module 1228 (e.g., Application Program Interface 424 in FIG. 4A), for providing access to device context information via a set of consistent and documented protocols so as to enable a number of different applications to efficiently and effectively access device context information and adjust operation of the device or other devices in accordance with that information, optionally including:
- one or more Virtual Context Sensors 1230 (e.g., Virtual Context Sensors 418 in FIG. 4A) for providing organized device context information where an application can subscribe to changes in a particular type of device context information (e.g., by subscribing to changes in a particular virtual context sensor) or can request information regarding a current device context;
- one or more Derived Position Sensors 1232 (e.g., Derived Position Sensors 420 in FIG. 4A) for providing device position information that includes contributions from sources other than absolute positioning sensors (e.g., inertial sensor information filtered through Probabilistic Model 1226); and
- Historical Device Information 1234 (e.g., Historical Device Information 422 in FIG. 4A) for storing a record of device context information (e.g., storing past virtual sensor measurements corresponding to Virtual Context Sensors 1230) and device position information (e.g., storing past virtual sensor measurements corresponding to Derived Position Sensors 1232) and making this information available to applications via Application Program Interface Module 1228;

Navigational State Compensator 1238 for determining a fixed compensation (e.g., a rotational offset) for compensating for drift in the navigational state estimate of Device 102;

Navigation State Estimator 1240 for estimating navigational states of Device 102, optionally including:
- Kalman Filter Module 1242 that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector 2 in Equation 10 of U.S. Pat. Pub. No. 2010/0174506), a mapping, Kalman filter matrices, and attitude estimates (e.g., the attitude estimates as obtained from the quaternion in the state vector 2 in Equation 10 of U.S. Pat. Pub. No. 2010/0174506);
- Magnetic Field Residual 1244 that is indicative of a difference between a magnetic field detected based on measurements from Magnetometer(s) 1272 and a magnetic field estimated based on Kalman Filter Module 1242;
- Pedestrian Dead Reckoning Module 1246, for determining a direction of motion of the entity and updating a position of the device in accordance with the direction of motion of the entity, stride length and stride count; and
- data representing Navigational State Estimate 1250 (e.g., an estimate of the position and/or attitude of Device 102).

optionally, User Interface Module 1252 that receives commands from the user via Input Device(s) 1207 and generates user interface objects in Display(s) 1206 in accordance with the commands and the navigational state of Device 102, User Interface Module 1252 optionally includes one or more of: a cursor position module for determining a cursor position for a cursor to be displayed in a user interface in accordance with changes in a navigational state of the navigation sensing device, an augmented reality module for determining positions of one or more user interface objects to be displayed overlaying a dynamic background such as a camera output in accordance with changes in a navigational state of the navigation sensing device, a virtual world module for determining a portion of a larger user interface (a portion of a virtual world) to be displayed in accordance with changes in a navigational state of the navigation sensing device, a pedestrian dead reckoning module for tracking movement of Device 102 over time, and other application specific user interface modules; and optionally, Gesture Determination Module 1254 for determining gestures in accordance with detected changes in the navigational state of Device 102.

It is noted that in some of the embodiments described above, Host 101 does not store data representing Sensor Measurements 1214, because sensor measurements of Device 102 are processed at Device 102, which sends data representing Navigational State Estimate 1250 to Host 101. In other embodiments, Device 102 sends data representing Sensor Measurements 1214 to Host 101, in which case the modules for processing that data are present in Host 101.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1202). The above identified modules or programs (i.e., sets of instructions) need not be implemented as separate software programs, procedures or modules, and thus various subsets of these modules may be combined or otherwise re-arranged in various embodiments. The actual number of processors and software modules used to implement Host 101 and how features are allocated among them will vary from one implementation to another. In some embodiments, Memory 1210 may store a subset of the modules and data structures identified above. Furthermore, Memory 1210 may store additional modules and data structures not described above.

Note that method 500 described above is optionally governed by instructions that are stored in a non-transitory computer readable storage medium and that are executed by one or more processors of Device 102 or Host 101. As noted above, in some embodiments these methods may be performed in part on Device 102 and in part on Host 101, or on a single integrated system which performs all the necessary operations. Each of the operations shown in FIGS. 5A-5F optionally correspond to instructions stored in a computer memory or computer readable storage medium of Device 102 or Host 101. The computer readable storage medium optionally includes a magnetic or optical disk storage device, solid state storage devices such as Flash memory, or other non-volatile memory device or devices. In some embodiments, the computer readable instructions stored on the computer readable storage medium are in source code, assembly language code, object code, or other instruction format that is interpreted or executed by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of controlling operation of a respective device comprising:
   at a processing apparatus having one or more processors and memory storing one or more programs that, when executed by the one or more processors, cause the respective processing apparatus to perform the method:
      obtaining one or more sensor measurements generated by one or more monitoring sensors of one or more devices, including one or more monitoring sensor measurements from a respective monitoring sensor of the respective device;
      obtaining one or more system signals including a respective system signal corresponding to current operation of the respective device;
      determining device context information for the respective device based on the one or more sensor measurements and the one or more system signals, the determining device context information including combining the one or more sensor measurements and the one or more system signals using a probabilistic model that iterates over a plurality of measurement epochs; and
      for a respective measurement epoch of the plurality of measurement epochs:
         if a respective monitoring sensor measurement of the one or more monitoring sensor measurements indicates a first device context that is physically incompatible with a second different device context indicated by the respective system signal corresponding to the current operation of the respective device,
         then causing the device context information generated by the probabilistic model for the respective measurement epoch to include a contribution from the respective monitoring sensor measurement and a contribution from the respective system signal; and
         unlocking the respective device with one of default authentication criteria and modified authentication criteria, the criteria being selected based on the determined device context information.

2. The method of claim 1, wherein:
   the one or more monitoring sensors include one or more sensors selected from the set consisting of: an accelerometer, a magnetometer, a gyroscope, and an inertial measurement unit; and
   the one or more system signals do not include monitoring sensor measurements from the one or more monitoring sensors.

3. The method of claim 1, wherein:
   the one or more monitoring sensors are inertial sensors; and
   the one or more system signals do not include inertial sensor measurements.

4. The method of claim 1, wherein the device context information generated by the probabilistic model for the respective measurement epoch includes a contribution from one or more historical states of the probabilistic model.

5. The method of claim 1, wherein:
   obtaining the one or more monitoring sensor measurements includes receiving the one or more monitoring sensor measurements at a predefined rate; and
   obtaining the one or more system signals includes receiving the one or more system signals at a variable rate determined based on the one or more monitoring sensor measurements.

6. The method of claim 1, further comprising generating virtual sensor outputs of a plurality of virtual sensors corresponding to at least a subset of the device context information, wherein:
   the plurality virtual sensors includes a first virtual sensor and a second virtual sensor;
   the first virtual sensor corresponds to a first combination of selected sensors and system signals of the respective device;
   the second virtual sensor corresponds to a second combination of selected sensors and system signals of the respective device; and
   the first combination includes at least one sensor that is not included in the second combination.

7. The method of claim 6, wherein:
   a respective virtual sensor of the plurality of virtual sensors is configured to select among a plurality of alternative sensor outputs; and
   the respective virtual sensor provides one of the alternative sensor outputs at a time.

8. The method of claim 6, wherein:
   a respective virtual sensor of the plurality of virtual sensors is configured to select among a plurality of concurrent sensor outputs; and
   the respective virtual sensor provides probabilities for two or more of alternative sensor outputs concurrently.

9. The method of claim 1, wherein the one or more system signals include one or more of:
   a sensor measurement from a non-inertial sensor;
   a system event signal corresponding to an event detected by an operating system of the respective device; and
   application data received by an application running on the respective device.

10. The method of claim 1, wherein:
    determining the device context information for a current measurement epoch includes combining the respective system signal and a confidence level for the respective system signal; and
    updating the confidence level for the respective system signal based on a comparison between an interpretation of the respective system signal and an interpretation of one or more corresponding monitoring sensor measurements.

11. The method of claim 1, wherein:
    unlocking the respective device includes enabling the modified authentication criteria; and the method includes:
    after enabling the modified authentication criteria, receiving a request to unlock the respective device; and
    in response to receiving the request to unlock the respective device:
        in accordance with a determination that the modified authentication criteria have not been met, challenging the user to meet the default authentication criteria; and
        in accordance with a determination that the modified authentication criteria have been met, unlocking the respective device without challenging the user to meet the default authentication criteria.

12. The method of claim 1, comprising:
during a first measurement epoch of the plurality of measurement epochs:
    obtaining a first sensor measurement of the respective monitoring sensor and a system signal corresponding to a respective resource-intensive sensor;
    determining the device context information for the respective device based on the first sensor measurement of the respective monitoring sensor and the system signal corresponding to the respective resource-intensive sensor; and
    training a context-determination model using the system signal corresponding to the resource-intensive sensor, wherein the context-determination model takes sensor measurements from the respective monitoring sensor as inputs; and
during a second measurement epoch that is after the first measurement epoch:
    obtaining a second sensor measurement of the respective monitoring sensor; and
    determining the device context information for the respective device based on the second sensor measurement of the respective monitoring sensor and the context-determination model, without using the system signal corresponding to the resource-intensive sensor.

13. The method of claim 1, further comprising storing historical device status information, including historical context information corresponding to context information determined during prior measurement epochs.

14. The method of claim 13, comprising:
receiving, from a requestor, a request for context information corresponding to reference information; and
in response to receiving the request:
    identifying respective device status information corresponding to the reference information in the historical device status information; and
    providing the respective device status information to the requestor.

15. The method of claim 13, wherein:
determining the context information further includes determining respective context information that is inconsistent with at least a portion of the historical context information; and
the method includes, in accordance with a determination that the respective context information meets revision criteria, revising the historical context information so as to reduce the inconsistency between the historical context information and the respective context information.

16. The method of claim 13, wherein storing the historical device status information corresponding to the context information determined during prior measurement epochs, includes:
    storing high-resolution device status information for a first set of the prior measurement epochs; and
    storing low-resolution device status information for a second set of the prior measurement epochs, wherein the second set of prior measurement epochs includes older measurement epochs than the first set of prior measurement epochs.

17. A processing apparatus, comprising:
one or more processors;
a set of one or more sensors;
memory; and
one or more programs, wherein the one or more programs are stored in the memory and configured to be executed by the one or more processors, the one or more programs including instructions for performing a method of controlling operation of a respective device comprising:
    obtaining one or more sensor measurements generated by one or more monitoring sensors of one or more devices, including one or more monitoring sensor measurements from a respective monitoring sensor of the respective device;
    obtaining one or more system signals including a respective system signal corresponding to current operation of the respective device;
    determining device context information for the respective device based on the one or more sensor measurements and the one or more system signals, the determining device context information including combining the one or more sensor measurements and the one or more system signals using a probabilistic model that iterates over a plurality of measurement epochs; and
    for a respective measurement epoch of the plurality of measurement epochs:
        if a respective monitoring sensor measurement of the one or more monitoring sensor measurements indicates a first device context that is physically incompatible with a second different device context indicated by the respective system signal corresponding to the current operation of the respective device,
        then causing the device context information generated by the probabilistic model for the respective measurement epoch to include a contribution from the respective monitoring sensor measurement and a contribution from the respective system signal; and
    unlocking the respective device with one of default authentication criteria and modified authentication criteria, the criteria being selected based on the determined device context information.

18. A non-transitory computer readable storage medium storing one or more programs, the one or more programs comprising instructions, which when executed by a processing apparatus with one or more processors, perform a method of controlling operation of a respective device which causes the processing apparatus to:
    obtain one or more sensor measurements generated by one or more monitoring sensors of one or more devices, including one or more monitoring sensor measurements from a respective monitoring sensor of the respective device;

obtain one or more system signals including a respective system signal corresponding to current operation of the respective device;

determine device context information for the respective device based on the one or more sensor measurements and the one or more system signals, the determining device context information including combining the one or more sensor measurements and the one or more system signals using a probabilistic model that iterates over a plurality of measurement epochs; and for a respective measurement epoch of the plurality of measurement epochs:
  if a respective monitoring sensor measurement of the one or more monitoring sensor measurements indicates a first device context that is physically incompatible with a second different device context indicated by the respective system signal corresponding to the current operation of the respective device,
  then cause the device context information generated by the probabilistic model for the respective measurement epoch to include a contribution from the respective monitoring sensor measurement and a contribution from the respective system signal; and unlock the respective device with one of default authentication criteria and modified authentication criteria, the criteria being selected based on the determined device context information.

* * * * *